(12) United States Patent
Fehrmann et al.

(10) Patent No.: US 10,207,221 B2
(45) Date of Patent: Feb. 19, 2019

(54) COMBINED OXIDATION AND ABSORPTION OF $NO_x$ BY AN IONIC LIQUID TANDEM PROCESS

(71) Applicant: Danmarks Tekniske Universitet, Kgs. Lyngby (DK)

(72) Inventors: Rasmus Fehrmann, Copenhagen Ø (DK); Anders Riisager, Taastrup (DK); Susanne L. Mossin, Copenhagen K (DK); Peter Thomassen, Gentofte (DK); Anders Theilgaard Madsen, Copenhagen S (DK); Andreas Jonas Kunov-Kruse, København NV (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 82 days.

(21) Appl. No.: 15/304,471

(22) PCT Filed: Apr. 16, 2015

(86) PCT No.: PCT/EP2015/058309
§ 371 (c)(1),
(2) Date: Oct. 14, 2016

(87) PCT Pub. No.: WO2015/158849
PCT Pub. Date: Oct. 22, 2015

(65) Prior Publication Data
US 2017/0036164 A1    Feb. 9, 2017

(30) Foreign Application Priority Data
Apr. 16, 2014 (EP) ..................................... 14164843

(51) Int. Cl.
*B01D 53/56* (2006.01)
*B01D 53/86* (2006.01)
(Continued)

(52) U.S. Cl.
CPC ....... *B01D 53/869* (2013.01); *B01D 53/0462* (2013.01); *B01D 53/1481* (2013.01);
(Continued)

(58) Field of Classification Search
CPC ............ B01D 53/1456; B01D 53/1493; B01D 53/56; B01D 53/565; B01D 2252/30; B01D 2257/404; B01D 2251/102
(Continued)

(56) References Cited

U.S. PATENT DOCUMENTS 6,235,248 B1    5/2001  Buismann et al.
2012/0258030 A1  10/2012  Maruyama et al.

FOREIGN PATENT DOCUMENTS

WO    WO 2007/101397 A1    9/2007
WO    WO 2013/079597 A1    6/2013

OTHER PUBLICATIONS

Anderson, Jessica L. et al., "Solubility of CO2, CH4, C2H6, C2H4, O2, and N2 in 1-Hexyl-3-methylpyridinium Bis(trifluoromethylsulfonyl)imide: Comparison to Other Ionic Liquids" Accounts of Chemical Research, 2007, pp. 1208-1216, vol. 40.

(Continued)

*Primary Examiner* — Daniel McCracken
(74) *Attorney, Agent, or Firm* — Knobbe, Martens, Olson & Bear, LLP

(57) ABSTRACT

The present invention relates to a new strategy for capturing $NO_x$ using a two-step process.

13 Claims, 23 Drawing Sheets

(51) Int. Cl.
  *B01D 53/04* (2006.01)
  *B01D 53/14* (2006.01)
(52) U.S. Cl.
  CPC .... *B01D 53/8628* (2013.01); *B01D 2251/102* (2013.01); *B01D 2252/30* (2013.01); *B01D 2255/65* (2013.01); *B01D 2255/70* (2013.01); *B01D 2255/808* (2013.01); *B01D 2257/302* (2013.01); *B01D 2257/404* (2013.01); *B01D 2258/0283* (2013.01)
(58) Field of Classification Search
  USPC .............................................. 423/239.1, 235
  See application file for complete search history.

(56) References Cited

OTHER PUBLICATIONS

Anthony, Jennifer L. et al., "Solution Thermodynamics of Imidazolium-Based Ionic Liquids and Water" J. Phys. Chem. B, 2001, pp. 10942-10949, vol. 105.
Anthony, Jennifer L. et al., "Solubilities and Thermodynamic Properties of Gases in the Ionic Liquid 1-n-Butyl-3-methylimidazolium Hexafluorophosphate" J. Phys. Chem. B, 2002, pp. 7315-7320, vol. 106.
Anthony, Jennifer L. et al., "Anion Effects on Gas Solubility in Ionic Liquids" J. Phys. Chem. B, 2005, pp. 6366-6374, vol. 109.
Bosch, Hans et al., Catalysis Today, 1988, pp. 369-532, vol. 2 / Preface.
Busca, Guido et al., "Catalytic abatement of $NO_x$: Chemical and mechanistic aspects" Catalysis Today, 2005, pp. 139-148, vol. 107-108.
Duan, Erhong et al., "Absorption of NO and $NO_2$ in Caprolactam Tetrabutyl Ammonium Halide Ionic Liquids" Journal of the Air & Waste Management Association, Dec. 2011, pp. 1393-1397, vol. 61.
Gambardella, Francesca et al., "Experimental and Modeling Studies on the Absorption of NO in Aqueous Ferrous EDTA Solutions" Ind. Eng. Chem. Res., 2005, pp. 4234-4242, vol. 44.
Huang, Jun et al., "Tuning ionic liquids for high gas solubility and reversible gas sorption" Journal of Molecular Catalysis A: Chemical, 2008, pp. 170-176, vol. 279.
Kuhlmann, Esther "Entwicklung von Extraktions—nd Absorptionssystemen auf Basis ionischer Flüssigkeiten für die Entschwefelung von Kohlenwasserstoffen" Der Technischen Fakultät Der Universität Erlangen-Nürnberg zur Erlangung des Grades—Erlangen 2007, pp. 1-225.
Löffler, G. et al., "$NO_x$ formation in natural gas combustion—a new simplified reaction scheme for CFD calculations" Fuel, 2006, pp. 513-523, vol. 85.
Long, Xiang-Li et al., "Removal of Nitric Oxide and Sulfur Dioxide from Flue Gas Using a Hexamminecobalt(II)/Iodide Solution" Ind. Eng. Chem. Res., 2004, pp. 4048-4053, vol. 43.
Roncaroli, Federico et al., "New features in the redox coordination chemistry of metal nitrosyls {M-NO+; M-NO•; M-NO-(HNO)}" Coordination Chemistry Reviews, 2007, pp. 1903-1930, vol. 251.
Yang, Chen-Lu et al., "Aqueous Absorptions of Nitric Oxide Induced by Sodium Chlorite Oxidation in the Presence of Sulfur Dioxide" Environmental Progress, 1998, pp. 80-85, vol. 17, No. 2.
European Search Report for EP 14164843 dated Nov. 4, 2014.
International Search Report for PCT/EP2015/058309 dated Jul. 27, 2015.

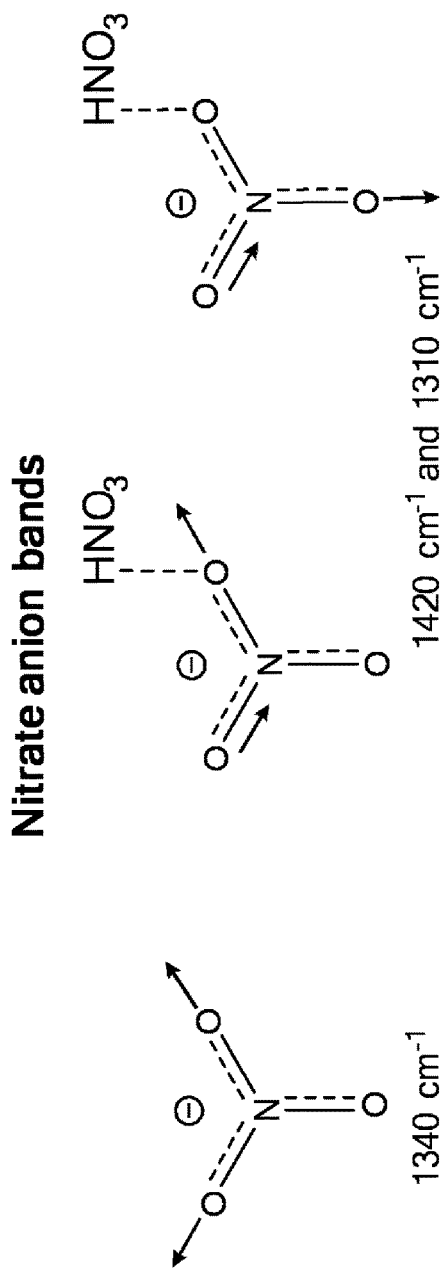
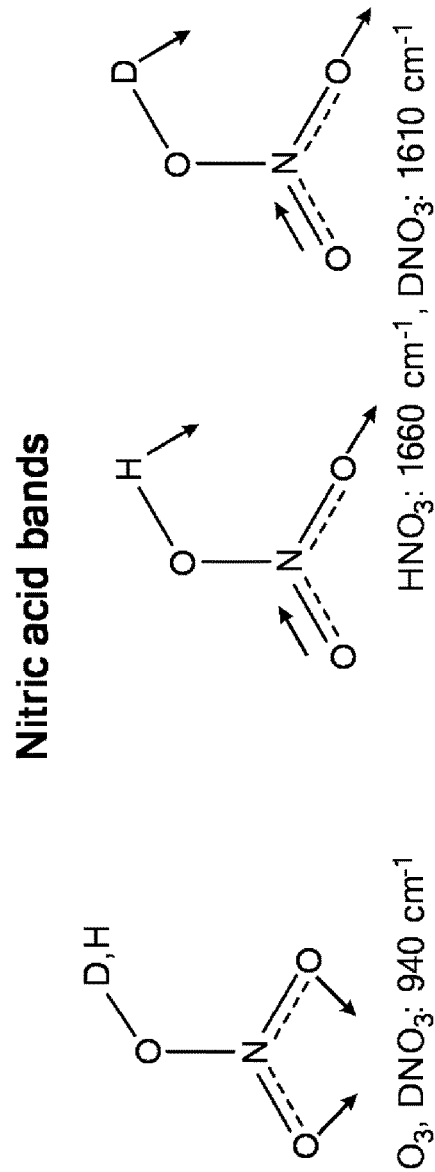
Fig. 15

COMBINED OXIDATION AND ABSORPTION OF $NO_x$ BY AN IONIC LIQUID TANDEM PROCESS

CROSS REFERENCE TO RELATED APPLICATIONS

This application is a U.S. National Phase Application of PCT International Application Number PCT/EP2015/058309, filed on Apr. 16, 2015, designating the United States of America and published in the English language, which is an International Application of, and claims the benefit of priority to, European Patent Application No. 14164843.6, filed on Apr. 16, 2014. The disclosures of the above-referenced applications are hereby expressly incorporated by reference in their entireties.

The present invention concerns a new strategy for capturing $NO_x$ using a two-step process.

BACKGROUND $NO_x$ is a generic term for the various nitrogen oxides produced during combustion or $NO_x$ being present in off-gasses in general. Nitrogen oxides are believed to aggravate asthmatic conditions, react with the oxygen in the air to produce ozone, which is also an irritant, and eventually form nitric acid when dissolved in water. In atmospheric chemistry the term $NO_x$ means the total concentration of NO, $NO_2$, $N_2O$, $N_2O_3$, $N_2O_4$ and $N_2O_5$. The man made emission of $NO_x$ is of environmental concern since $NO_x$ participates in detrimental photochemical reactions in both the troposphere and the stratosphere. $NO_x$ reacts with hydrocarbon containing pollutants forming health-threatening smog in densely populated areas as well as being active in depleting the ozone layer. The end product, $NO_2$, contributes to acid rain which can damage both trees and entire forest ecosystems. Consequently, the sources of $NO_x$ emissions are now being subjected to more stringent standards.

Nitrogen oxides can be formed during the combustion of nitrogen precursors in the fuel, defined as fuel $NO_x$, but also from the nitrogen in the air via two mechanisms, one designated as thermal $NO_x$, via the Zeldovich mechanism:

$$O+N_2 \rightarrow NO+N \quad [1]$$

$$N+O_2 \rightarrow NO+O \quad [2]$$

$$N+OH \rightarrow NO+H \quad [3]$$

The other is designated as prompt $NO_x$, where the nitrogen in air is fixed by hydrocarbon radicals and subsequently oxidized to $NO_x$ [G. Löffler et al. *Fuel*, vol. 85, pp. 513-523, 2006]:

$$N_2+CH \rightarrow HCN+N \quad [4]$$

Three primary sources of $NO_x$ formation in combustion processes are documented, the three processes being thermal $NO_x$ (reactions [1]-[3]), fuel $NO_x$ and prompt $NO_x$ (reaction [4]).

Thermal $NO_x$ formation, which is highly temperature dependent, is recognized as the most relevant source when combusting e.g. natural gas. Due to the high energy required to break the nitrogen triple bond—i.e. reaction scheme [1]—thermal $NO_x$ is primarily produced at high temperatures, usually above 1200° C. [H. Bosch et al. *Catal. Today*, vol. 46, pp. 233-532, 1988].

From a thermodynamic point of view, the reaction $N_2+O_2 \rightarrow 2NO$ is thermodynamically highly unfavored with a reaction enthalpy of $\Delta H°_{298\ K}=180$ kJ/mol [G. Busca et al. *Catal. Today*, vol. 107-108, pp. 139-148, 2005]. Therefore it requires very high temperatures to proceed at a reasonable rate. The formation of the various nitrogen compounds, $N_2O$, NO or $NO_2$, depends on the oxygen partial pressure, due to the increasing O/N ratio.

Another source of $NO_x$ production from nitrogen containing fuels, such as certain coals and oil, is the conversion of chemically bound nitrogen in the fuel to $NO_x$ during combustion. The nitrogen bound in the fuel is released exemplified by the following reaction:

$$4\ NH_3+5\ O_2 \rightarrow 4NO+6\ H_2O \quad [5]$$

where the nitrogen containing compounds, like ammonia and amines, are oxidized to NO. The reaction is thermodynamically highly favoured, with a reaction enthalpy of $\Delta H°_{298\ K}=-452$ kJ, although less favoured than the oxidation of $NH_3$ to $N_2$. The amount of formed 'fuel $NO_x$' primarily depends on the amount of nitrogen in the fuel, and is also strongly influenced by the reactor design. In natural gas (methane), nitrogen compounds are virtually absent, but substantial amounts of nitrogen is present in the case of coal, gas oils and fuel oils and especially in biofuels, such as wood.

Prompt $NO_x$ is generated when the fuel-to-air ratio is high and nitrogen radicals formed in reaction [4] react with oxygen via reaction [2]. The reactions are almost not temperature dependent, but the prompt $NO_x$ formed is negligible relative to thermal $NO_x$.

The numerous possibilities to reduce $NO_x$ can be divided into three categories; precombustion, combustion modifications and post combustion.

The precombustion strategy imply using alternative fuels with a lower content of nitrogen species. During combustion different types of modifications can be utilized, of which the most used are; low $NO_x$-burners, reburning (exhaust gas recirculation) and staged air combustion (thermal oxidation). A variety of other methods are also possible in the combustion modification; burners out-of-service, derating, burner system modification, trim and diluent injection.

Several post-combustion approaches are applied to reduce $NO_x$; selective catalytic reduction (SCR), selective non-catalytic reduction (SNCR), absorption, $NO_x$ recycle, direct decomposition, photocatalytic oxidation, multifunctional filter (removal of fly-ash and $NO_x$) and pulse intense electron beam irradiation.

A different concept is presented by wet scrubbing systems for removal of $SO_2$, $SO_3$ and $NO_x$. Some aqueous scrubbing systems have been developed for the simultaneous removal of $NO_x$ and $SO_2$ [C.-L. Yang et al. *Environmental Progress*, 17, 80-85 (1998)]. The wet flue gas desulfurization (FGD) typically exhibits high $SO_2$ removal efficiencies, but the FGD can only remove a small amount of $NO_x$ because about 90-95% in a typical flue gas is present as insoluble NO and only the remaining 5-10% $NO_2$ is water soluble.

Attempts to oxidize NO to water soluble $NO_2$ have been made by adding strong oxidizing additives, such as $MnO_4^-$ salts and $H_2O_2$, but the treatment cost involved herein has been too high for practical utilization.

Promising results of the simultaneous NO and $SO_2$ removal in a $[Co(NH_3)_6]^{2+}$ solution, which operates below 80° C., have been reported by Long et al. [X.-I. Long et al., *Industrial & Engineering Chemistry Research*, 43, 4048-4053 (2004)].

Another approach for removing NO is the complexation of NO with $Fe^{2+}$-chelates based on ethylenediaminetetraacetic acid (EDTA) or nitrilotriacetate (NTA), as outlined in reaction [6] for the case of iron-EDTA complex [F. Roncaroli et al., *Coordination Chemistry Reviews*, 251, 1903-1930 (2007)].

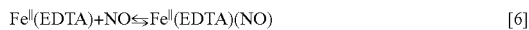
$$Fe^{II}(EDTA)+NO \leftrightarrows Fe^{II}(EDTA)(NO) \quad [6]$$

The metal-chelate can be electrochemically regenerated after absorption or reduced by sulfite ions to sulfate and nitrogen [F. Gambardella et al., *Industrial & Engineering Chemistry Research* 44, 4234-4242 (2005)].

In U.S. Pat. No. 6,235,248 a biotechnological approach to regenerate the iron-complex, the so-called BioDeNO$_x$ process was described. In this process the NO-saturated iron-chelate solution is brought in close contact with bacteria that regenerate the iron-EDTA complex and convert the bound nitrosyl to N$_2$. The Fe$^{II}$(EDTA) solution needs to be somewhat diluted (concentration <200 mM) due to the presence of microorganisms, which naturally limits the absorption capacity.

The above proposed technologies for NO removal are all associated with various challenges such as low capacity, large installation footprint, poor reaction kinetics, hazardous stoichiometric reductants or oxidants, elevated reaction temperatures and the requirement for specialized catalysts.

Many of the above proposed technologies are based on liquids with a vapour pressure, which means that the solvent to some extent vaporizes during operation.

One promising solution to this particular problem could be the use of solvents referred to as ionic liquids (ILs). The expression 'ionic liquid' in principle encompasses any liquid entirely composed of ions (e.g. molten salts). However, within the context of this work the term will only be used to describe materials which are liquid in their pure state at room temperature. This class of solvents is often considered as 'green' solvents because of their immeasurably low vapour pressure. This feature gives the ILs an essential advantage over traditional solvents used for absorbing gases. Ionic liquids have already demonstrated promising behaviour in a number of reactions where gaseous reactants enter the IL solution (such as hydrogenation, hydroformylation, and oxidations) despite low gas solubilities of the gases in the IL at ambient conditions [J. L. Anthony et al. *The Journal of Physical Chemistry B*, 106. 7315-7320 (2002)].

Another known application of ILs is to utilize them to separate gas mixtures. WO 2007/101397 discloses gas purification processes and mentions a broad range of ionic liquids as possible absorbers of many different gasses, but does not provide any experimental evidence supporting these propositions. WO 2007/101397 is instead merely a theoretical review since there is no data evidencing how the ionic liquids work.

A promising solid ionic cation (1,1,3,3-tetramethylguanidinium) has been identified for the absorption of SO$_2$ [J. Huang et al., *Journal of Molecular Catalysis A: Chemical*, 279, 170-176 (2008)]. Similarly, the solubilities of a number of gases (such as CO$_2$, CO, O$_2$) in imidazolium-based ILs has been reported by Anthony et al. [J. L. Anthony et al., *The Journal of Physical Chemistry B*, 106, 7315-7320 (2002)].

Ionic liquids tend to be more viscous compared to conventional solvents, which can result in challenges regarding the mass transfer of gas into the IL. In the case of low-soluble gases, the mass transfer into the IL will likely be a rate limiting step, which can be minimized by increasing the interfacial gas-IL area and/or use high pressure systems [J. L. Anthony et al., *The Journal of Physical Chemistry B*, 106, 7315-7320 (2002)].

Only limited information regarding the gas solubilities in ILs has been reported. Besides the reports regarding CO$_2$ capture, the focus of most work revolves around the reactions taking place in the IL with the gas already absorbed. Only few reports exist on gas solubilities [J. L. Anthony et al., *The Journal of Physical Chemistry B*, 106, 7315-7320 (2002); J. L. Anderson et al., *Accounts of Chemical Research*, 40, 1208-1216 (2007)]. The Brennecke group has, e.g. contributed with a number of seminal studies on absorption of a number of gases in imidazolium-based ILs [J. L. Anthony et al., *The Journal of Physical Chemistry B*, 106, 7315-7320 (2002); J. L. Anderson et al., *Accounts of Chemical Research*, 40, 1208-1216 (2007); J. L. Anthony et al., *The Journal of Physical Chemistry B*, 105, 10942-10949 (2001); J. L. Anthony et al., *The Journal of Physical Chemistry B*, 109, 6366-6374 (2005)].

Consequently, there is still a need for developing efficient and improved processes for removing NO$_x$, and specifically the most abundant NO$_x$ component NO, from flue gasses from not only large stationary sources like power or incineration plants, but also from mobile emission sources like, e.g. commercial marine vessels which require a small installation footprint and low energy consumption.

SUMMARY OF THE INVENTION

Disclosed herein is a method for removing NO$_x$ gasses by an absorption process and conversion of NO$_x$ to nitric acid (HNO$_3$) in the presence of oxygen and water, wherein the NO$_x$ gasses comprise NO, NO$_2$, N$_2$O$_3$, and N$_2$O$_5$. The NO$_x$ gas can also comprise N$_2$O$_4$.

The method comprises the step of a) pre-oxidation of nitric oxide (NO) to nitrogen dioxide (NO$_2$) and other H$_x$N$_y$O$_z$ species by use of an ionic composition catalyst at an oxidation temperature below the decomposition temperature of the ionic composition catalyst, thereby forming a pre-oxidized gas mixture. For H$_x$N$_y$O$_z$, x, y and z are integers in the ranges x=0-1, y=1-2, z=1-5. The ionic composition catalyst comprises one or more ionic compounds.

The method further comprises the step of b) absorption of NO$_2$ and other H$_x$N$_y$O$_z$ species generated in the pre-oxidation process of step a) and conversion of the absorbed NO$_2$ and other H$_x$N$_y$O$_z$ species to form nitric acid (HNO$_3$) wherein the absorption and conversion occurs in a medium in the presence of oxygen and water at an absorption/conversion temperature which is lower than the pre-oxidation temperature in step a) which accumulates in the medium.

Normally, NO$_x$ is removed from polluted air, exhaust gas, combustion gasses, e.g. of a combustion engine, gasses from a chemical reactor and similar. These gasses are sometimes referred to as off-gasses.

Using a two-step process including a pre-oxidation step provides a significantly more effective total reaction. The pre-oxidized gas mixture is more readily absorbed in the second step giving a significantly faster and more efficient conversion into to nitric acid. The nitric acid formed can be collected when regenerating the absorber, thus transforming the pollutant into a product of commercial value. By the present method, a different strategy to remove NO and NO$_2$ from a gas stream is presented, actively utilizing the water and oxygen present in the flue gas to chemically convert the NOx into nitric acid, HNO$_3$, which then accumulates in the IL due to the formation of strong hydrogen bonds. Absorption of NO from the simulated flue gas has been determined to have a second order dependence on NO. This second order dependence is a disadvantage, especially with a dilute reaction component. By pre-oxidizing the gas prior to absorption the reaction order in NOx likely becomes lower than 1, since conversion of $NO_2$ to $HNO_3$ can be facilitated solely by water (see reaction scheme below).

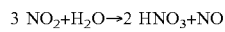

In the case of the IL, this reaction occurs differently, primarily forming HONO and $HNO_3$ in a 1:1 ratio, as is exemplified by the reaction scheme below.

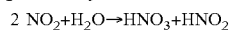

The above reaction is part of the catalytic cycle for the oxidation of NO to $HNO_3$ in ILs. Not having to perform the oxidation to near the same extent should significantly decrease the reaction order in NO, maybe even as low as below one. A such decrease in reaction order by the numerical value of one will under the conditions present in a flue gas, increase the reaction rate for the absorption by several orders of magnitude.

The in situ Attenuated Total Reflectance Fourier Transform Infrared (ATR-FTIR) spectroscopic results presented here shows interaction between a thin IL film and a combined gas stream containing dilute NO gas, atmospheric air and water. From time-resolved experiments we have extracted mechanistic evidence for the pre-oxidation and absorption reactions as well as the stoichiometry, kinetics and mechanism of the absorption.

BRIEF DESCRIPTION OF THE FIGURES

FIG. 15 shows the symmetric and antisymmetric N—O stretch modes of the $HNO_3$ dimer.

DETAILED DESCRIPTION OF THE INVENTION

Figure 1:
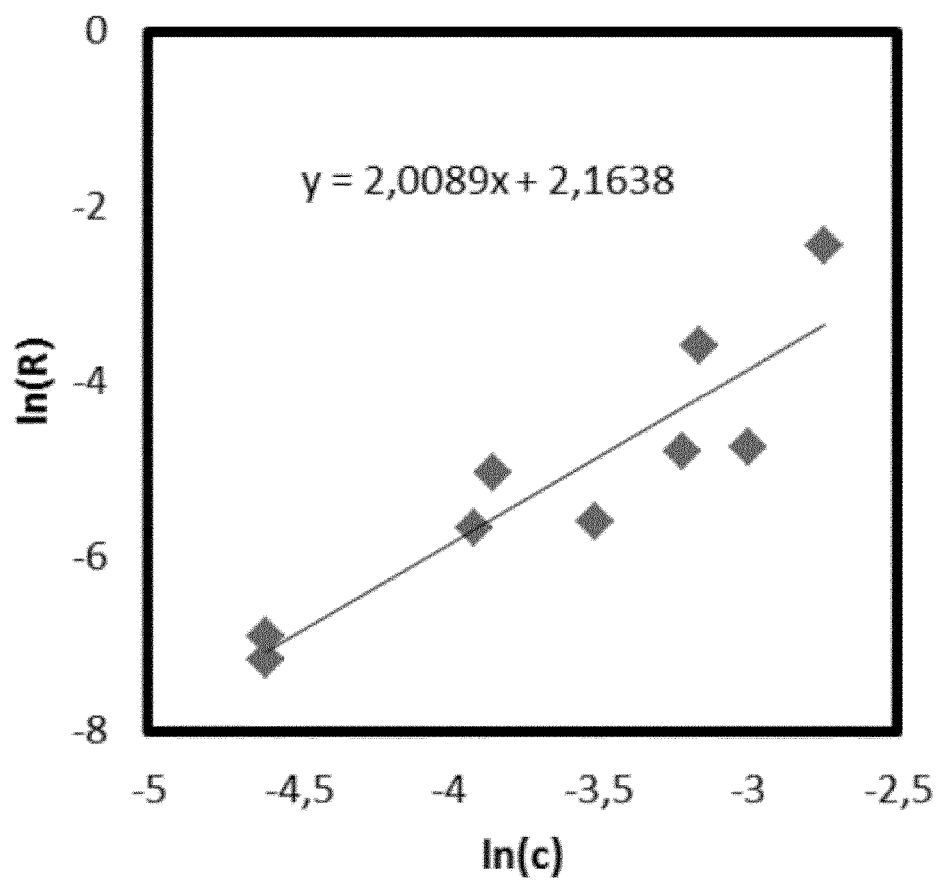
FIG. 1 shows the kinetic data suggesting that the reaction rate is second order with respect to NO.

In an aspect of the invention, a method for removing $NO_x$ gasses by an absorption process and conversion of $NO_x$ to nitric acid ($HNO_3$) in the presence of oxygen and water, wherein the $NO_x$ gasses comprise NO, $NO_2$, $N_2O_3$ and $N_2O_5$. The $NO_x$ gas can also comprise $N_2O_4$.

The method comprises the step of a) pre-oxidation of nitric oxide (NO) to nitrogen dioxide ($NO_2$) by use of an ionic composition catalyst at an oxidation temperature below the decomposition temperature of the ionic composition catalyst, thereby forming a pre-oxidized gas mixture. In the pre-oxidation step, other $H_xN_yO_z$ species may also be formed in addition to $NO_2$, where x, y and z are integers in the ranges x=0-1, y=1-2, z=1-5. Normally $NO_2$ will be the dominant species generated in the pre-oxidation process however, step a) may also include pre-oxidation of nitric oxide (NO) to nitrogen dioxide ($NO_2$) and other $H_xN_yO_z$ species by use of an ionic composition catalyst at an oxidation temperature below the decomposition temperature of the ionic composition catalyst.

The method further comprises the step of b) absorption of $NO_2$ and other $H_xN_yO_z$ species generated in the pre-oxidation process of step a) and conversion of the absorbed $NO_2$ and other $H_xN_yO_z$ species to form nitric acid ($HNO_3$) wherein the absorption and conversion occurs in a medium in the presence of oxygen and water at an absorption/conversion temperature which is lower than the pre-oxidation temperature in step a) which accumulates in the medium.

The ionic composition catalyst may preferentially comprise one or more ionic compounds.

In one or more embodiments, the medium is an ionic composition absorber comprising one or more ionic compounds.

In one or more embodiments, the ionic composition absorber is different from the ionic composition catalyst.

In one or more embodiments, the ionic composition absorber is identical to the ionic composition catalyst.

In one or more embodiments, the ionic composition catalyst is adjusted in volume and/or flow rate to obtain a high conversion of NO to $NO_2$ and other $H_xN_yO_z$ species in the pre-oxidized gas mixture before performing step b).

In one or more embodiments, the conversion of NO to $NO_2$ and other $H_xN_yO_z$ species is more than 50%.

In one or more embodiments, the conversion of NO to $NO_2$ and other $H_xN_yO_z$ species is more than 60%.

In one or more embodiments, the conversion of NO to $NO_2$ and other $H_xN_yO_z$ species is more than 70%.

In one or more embodiments, the conversion of NO to $NO_2$ and other $H_xN_yO_z$ species is more than 80%.

In one or more embodiments, the conversion of NO to $NO_2$ and other $H_xN_yO_z$ species is more than 90%.

In one or more embodiments, the conversion of NO to $NO_2$ and other $H_xN_yO_z$ species is a full conversion.

In one or more embodiments, the pre-oxidation temperature in step a) is between 70 and 200° C., between 75 and 150° C., or between 80 and 120° C. In one embodiment the pre-oxidation temperature in step a) is between 20 and 200° C., or between 40 and 200° C., or between 20 and 150° C., or between 30 and 120° C., or between 30 and 100° C., or between 30 and 50° C., or between 40 and 50° C.

In one or more embodiments, the absorption/conversion temperature in step b) is between 20 and 120° C., between 25 and 100° C., or between 30 and 80° C.

In one or more embodiments, the one or more ionic compounds in the ionic composition catalyst and/or the ionic composition absorber comprising one or more organic cations selected from:

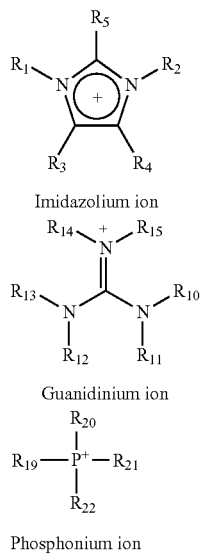

Imidazolium ion

Ammonium ion

Guanidinium ion

Sulfonium ion

Phosphonium ion wherein
R1, R2, R3, R4, R5, R6, R7, R8, R9, R10, R11, R12, R13, R14, R15, R16, R17, R18, R19, R20, R21 and R22 can be, independently, hydrogen, alkyl, halogenated alkyl, aminoalkyl, hydroxyalkyl, alkoxyalkyl, alkenyl, alkynyl, aryl, heteroaryl, cycloalkyl, cycloalkenyl, heterocycloalkyl, or heterocycloalkenyl;

the positively charged P, N and S atoms may individually be part of heterocyclic or heteroaromatic structures by letting:
two of R20, R21, R22, R23, e.g. R21 and R22 be fused such that a cyclic phosphonium ion is formed; or
two of R6, R7, R8, R9 eg. R6 and R7 be fused, such that a cyclic ammonium ion is formed, such as a pyridinium ion; or
two of R11 and R12, R13 and R14, R15 and R10, eg. R11 and R12 be fused, such that a cyclic guanidinium ion is formed; or
two of R16, R17 and R18 eg. R16 and R17 be fused, such that a cyclic sulfonium ion is formed;
optionally one or more cations selected from inorganic cations such as $Li^+$, $Na^+$ and $K^+$, and
one or more anions selected from $C_1$-$C_6$ alkanoates such as acetate, arylcarboxylates such as benzoate, $C_1$-$C_6$ alkylsulfates such as ethyl sulfate, $C_1$-$C_6$ alkylsulfonates, $C_1$-$C_6$ perfluoroalkylsulfonates such as triflate, $C_1$-$C_6$ perfluoroalkanoates such as trifluoroacetate, $C_1$-$C_6$ perfluoroalkylsulfonimides such as bis(trifluoromethylsulfonyl) imide (triflic imide), tetrafluoroborate, hexafluorophosphate, sulfate, nitrate and halides such as chloride or bromide.

In one or more embodiments, the one or more ionic compounds in the ionic composition catalyst and/or the ionic composition absorber comprising a cation having the following structure:

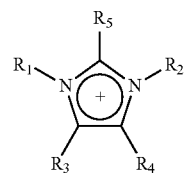

wherein $R_1$ and $R_2$ are individually selected from $C_1$-$C_8$ alkyl groups or aryl groups, and wherein $R_3$, $R_4$ and $R_5$ are individually selected from hydrogens, $C_1$-$C_6$ alkyl groups or aryl groups or wherein $R_3$ and $R_4$ together with the imidazolium group may form a 4- to 6-membered saturated, unsaturated or aromatic ring, which may further contain up to three hetero atoms selected from oxygen, nitrogen and phosphorus.

In one or more embodiments, the one or more ionic compounds in the ionic composition catalyst and/or the ionic composition absorber comprising a cation selected from:
BMIM=1-butyl-3-methylimidazolium, EMIM=1-ethyl-3-methylimidazolium, BMMIM=1-butyl-2,3-dimethylimidazolium, choline=N-(2-hydroxyethyl)-N,N,N-trimethylammonium.

In one or more embodiments, the one or more ionic compounds in the ionic composition catalyst and/or the ionic composition absorber is selected from 1-ethyl-3-methylimidazolium ($[EMIM]^+$) acetate, 1-butyl-3-methylimidazolium ($[BMIM]^+$) acetate, 1-ethyl-3-methylimidazolium ($[EMIM]^+$) triflate, 1-butyl-3-methylimidazolium ($[BMIM]^+$) triflate, 1-ethyl-3-methylimidazolium ($[EMIM]^+$) nitrate, 1-butyl-3-methylimidazolium ($[BMIM]^+$) nitrate, 1-butyl-2,3-dimethylimidazolium ([BM- MIM]$^+$) nitrate, choline chloride, choline acetate and 1,1,3,3-tetramethylguanidinium chloride.

In one or more embodiments, the ionic composition catalyst and/or the ionic composition absorber further comprises one or more cations selected from Li$^+$, Na$^+$ and K$^+$.

In one or more embodiments, the ionic composition catalyst and/or the ionic composition absorber contains a non-ionic solvent.

In one or more embodiments, the ionic composition catalyst and/or the ionic composition absorber contains a solid material.

In one or more embodiments, the one or more ionic compounds in the ionic composition catalyst is an ionic liquid.

In one or more embodiments, the one or more ionic compounds in the ionic composition absorber is an ionic liquid.

In one or more embodiments, the ionic composition catalyst and/or the ionic composition absorber is dispersed on a porous carrier and used in the form of a supported ionic composition phase material In one or more embodiments, the ionic composition catalyst and/or the ionic composition absorber is an ionic liquid dispersed on a porous carrier and used in the form of a supported ionic liquid phase (SILP) material.

Supported Ionic Liquid Phase (SILP) materials consist of an ionic liquid distributed over a porous support material with a high surface area. SILP materials are particularly useful for reactions involving gas phase reactants and may be used as catalysts, where the ionic liquid is the catalytically active component itself or is used to dissolve catalytically active components in the ionic liquid phase, or as gas absorbers. Since most ILs are highly viscous, simply bubbling a gaseous reactant through the liquid leads to an insufficient substance transport over the phase boundary due to the large bubble size and slow diffusion in the liquid phase. The SILP formulation eases diffusion, since the available surface area becomes much larger.

IL and/or SILP materials provide high thermal stability, low vapor pressures and high electronic and proton conductivities.

In one or more embodiments, the porous carrier material is composed of carbon, zeolites, clays, hydroxides or oxides based on the elements Si, Al, Ti, Ce, Zr, Mg, Fe, Ca, Sr, Ba, Mn, Ge and/or Ga.

In one or more embodiments, the porous carrier material is selected from $SiO_2$, $Al_2O_3$, $TiO_2$, $CeO_2$, $ZrO_2$, carbon or a combination of two or more of these.

In one or more embodiments, the porous carrier material is $TiO_2$, e.g. anatase $TiO_2$.

The porous carrier material may be crushed and fractioned to obtain particles e.g. of sizes from 180-355 μm.

In one or more embodiments, a wet scrubbing system for removal of $SO_2$ and $SO_3$ comprised in the off-gasses is implemented before performing step a).

In one or more embodiments, the off-gasses are flue gases originating either from large stationary sources like power or incineration plants or cement production plants, or from mobile emission sources like e.g. commercial marine vessels or mobile incineration plants for incineration of e.g. domestic or industrial waste.

Throughout the present application, if not otherwise specified, 'incineration plant' shall mean any stationary or mobile technical unit and equipment dedicated to the thermal treatment of wastes with or without recovery of the combustion heat generated. This includes the incineration by oxidation of waste as well as other thermal treatment processes such as pyrolysis, gasification or plasma processes in so far as the substances resulting from the treatment are subsequently incinerated.

NO removal in mobile units, such as commercial marine vessels and mobile incineration units for e.g. domestic or industrial waste represent other relevant examples for considering the implementation of the reversible ionic compositions system of the present invention because of the much less hazardous reaction conditions, lower reaction temperatures and smaller installation footprint.

Throughout the present application, if not otherwise specified, off-gasses is to be understood as any gas emitted leading to air pollution as exhaust or combustion gasses, e.g. of a combustion engine or a chemical reactor and similar.

Throughout the present application, if not otherwise specified all nitrogen dioxide species, including dimers thereof, are considered as chemical $NO_2$ and are thus referred to as $NO_2$ in argumentation and reactions.

The reaction converting NO to $HNO_3$ when NO is in the presence of oxygen and water is thermodynamically favored with $\Delta_r G = -210$ kJ mol$^{-1}$.

$$4\ NO(g) + 3\ O_2(g) + 2\ H_2O(l) \rightarrow 4\ HNO_3(l) \qquad [7]$$

Kinetically, however, the reaction in reaction scheme [7] is very hindered. NO is a relatively unreactive molecule but will easily react once activated. The base-strength of the anion in the ionic liquid is believed to be important in providing this activation of NO. The kinetic data shown in FIG. 1 shows a plot of the logarithmic relative reaction rate (R) as a function of the logarithmic concentration. The equation for the linear trend line is also shown in the figure and points clearly to the reaction being second order in NO.

The oxidation of NO to $NO_2$ in the gas phase and to $H^+/NO_2^-$ in the aqueous phase has the same rate law, as described below:

$$-\frac{d[NO]}{dt} = k[NO]^2[O_2] \qquad [8]$$

This is despite the total reactions for gas phase (reaction scheme [9]) and for aqueous solution (reaction scheme [10]) being rather different as shown below.

$$2\ NO(g) + O_2(g) \rightarrow 2\ NO_2(g) \qquad [9]$$

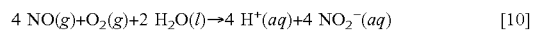
$$4\ NO(g) + O_2(g) + 2\ H_2O(l) \rightarrow 4\ H^+(aq) + 4\ NO_2^-(aq) \qquad [10]$$

A second order dependence on the concentration of NO(g) over an ionic liquid (IL) film was observed. Thus, the same rate law is also expected to be relevant for the rate-determining step in ionic liquid solution.

A first step in the condensed ionic liquid phase obeying the second order rate law could be:

$$NO(g) + NO_3^-(IL) \leftrightarrows N_2O_4^-(IL) \qquad [11]$$

Nitrate ($NO_3^-$) is a much more powerful base and nucleophile in the ionic liquid phase than in normal aqueous solution allowing it to attack the kinetically inert NO gas molecule. The unstable adduct then decomposes to nitrogen species in the intermediate oxidation steps:

$$N_2O_4^-(IL) \leftrightarrows NO_2(IL) + NO_2^-(IL) \qquad [12]$$

$$2\ NO_2(IL) \leftrightarrows N_2O_4(IL) \qquad [13]$$

In the majority of the described experiments water is purposely provided to the reaction. The second part in the reactions for converting NO to $HNO_3$ is therefore envisioned to proceed through the following steps:

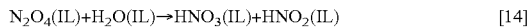

$$N_2O_4(IL)+H_2O(IL) \rightarrow HNO_3(IL)+HNO_2(IL) \quad [14]$$

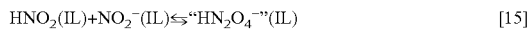

$$HNO_2(IL)+NO_2^-(IL) \leftrightharpoons \text{"}HN_2O_4^-\text{"}(IL) \quad [15]$$

The last dimeric species formed in reaction [15] is simply bonded by a strong hydrogen bond holding the two N(III) species close together and activating them for oxidation by dioxygen in one step. The product is the analogous nitrate-nitric acid dimer ("$HN_2O_6^-$"):

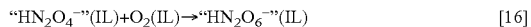

$$\text{"}HN_2O_4^-\text{"}(IL)+O_2(IL) \rightarrow \text{"}HN_2O_6^-\text{"}(IL) \quad [16]$$

Figure 4A:
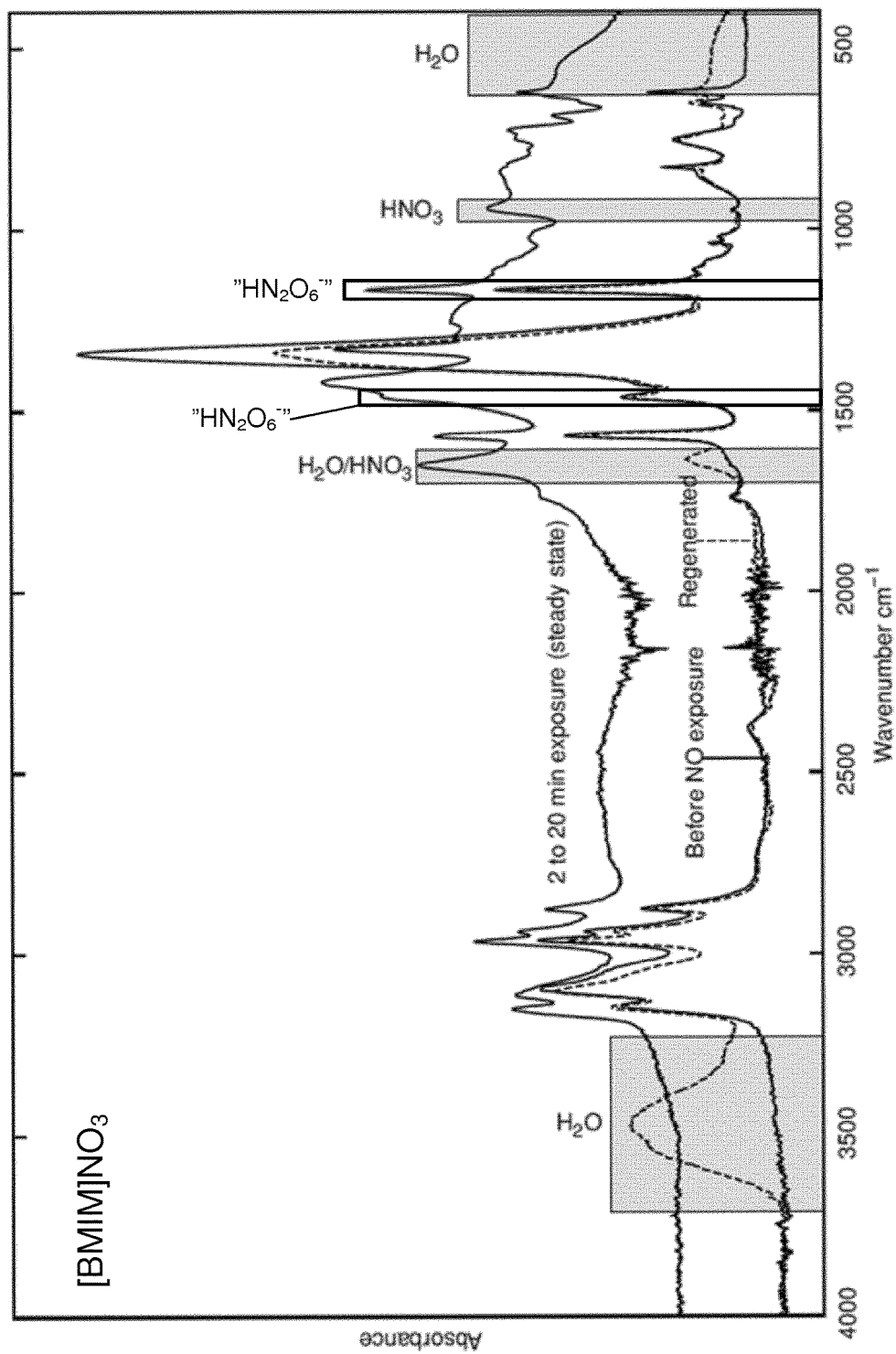
FIG. 4a shows the FT-IR spectra of [BMIM]$NO_3$ at different exposure times.

The nitrate-nitric acid dimer is clearly observable in the IR spectrum of [BMIM]$NO_3$ (1-butyl-3-methylimidazolium nitrate) shown in FIG. 4a as the peaks at 1296 and 1420 $cm^{-1}$. The nitrate-nitric acid dimer is the final product until the nitric acid is desorbed by increasing the temperature as shown in reaction [17]:

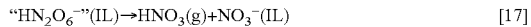

$$\text{"}HN_2O_6^-\text{"}(IL) \rightarrow HNO_3(g)+NO_3^-(IL) \quad [17]$$

The suggested complete reaction pathway is shown in the catalytic cycle below. Here, the total reaction for the oxidation of NO to $HNO_3$ catalyzed at RT by nitrate based ILs is shown.

Figure 3:
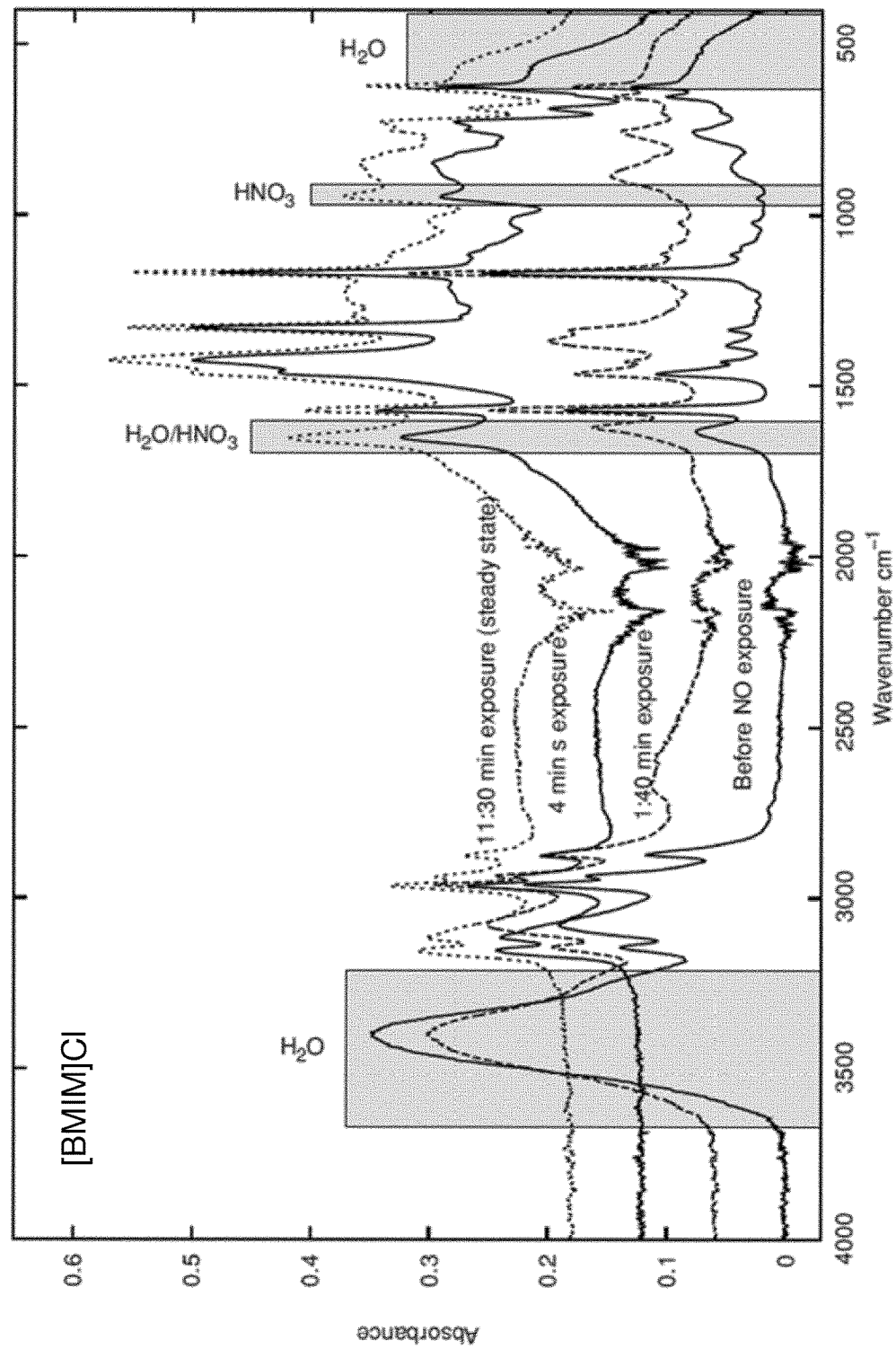
FIG. 3 shows the FT-IR spectra of [BMIM]Cl at different exposure times.

Acetic acid is volatile and is easily expelled from the IL under flow conditions, leaving the [BMIM]$NO_3$ to perform further oxidation and absorption. A similar situation is seen for [BMIM]Cl (1-butyl-3-methylimidazolium chloride) since chloride is also a stronger base than nitrate in the IL and HCl—a gas—will desorb readily from the ionic liquid. The IR spectra of [BMIM]Cl at different times after NO exposure is shown in FIG. 3 and shows the buildup of $HNO_3$ observed as the bands at 940 $cm^{-1}$ and 1660 $cm^{-1}$.

Figure 6:
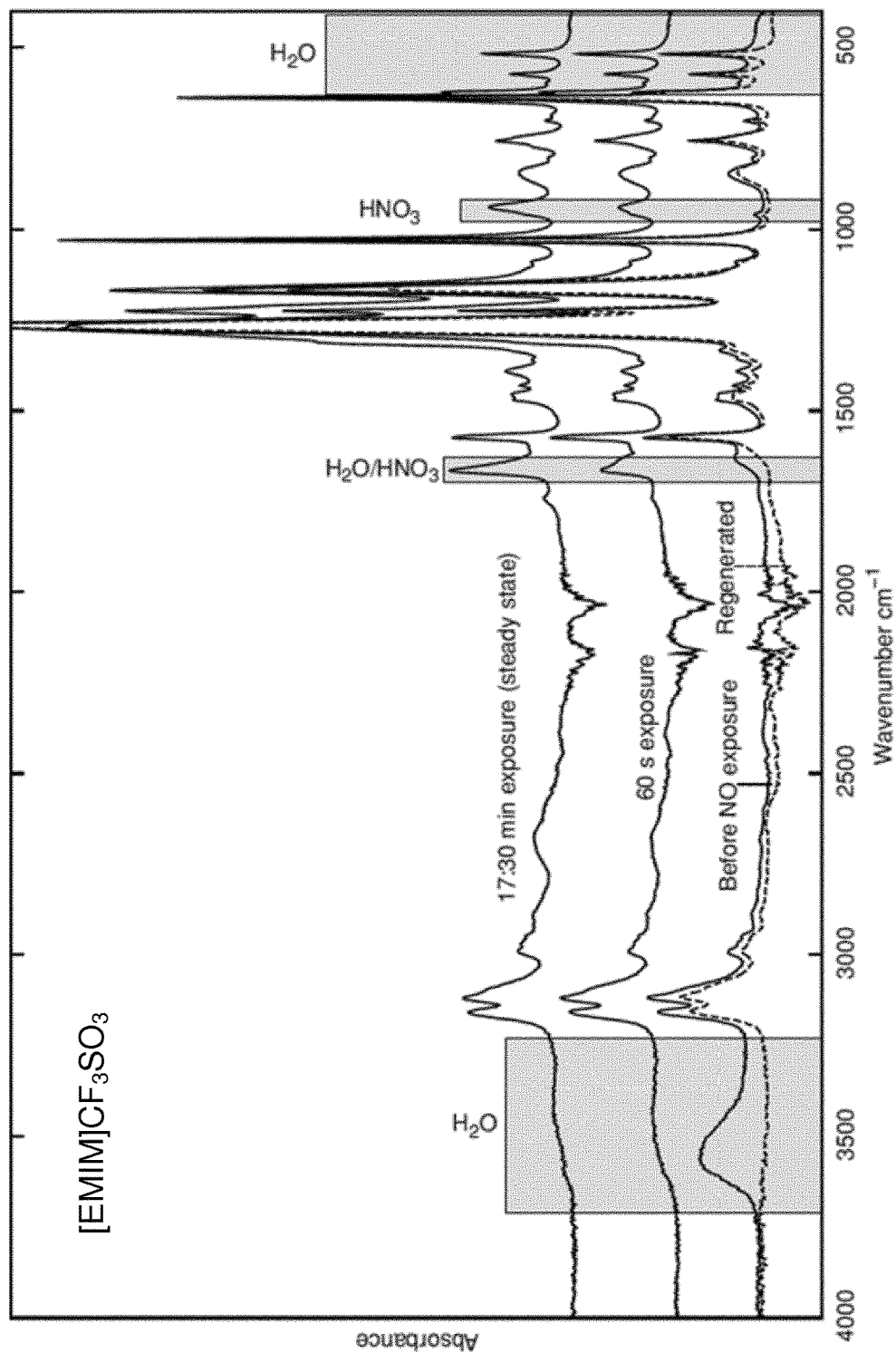
FIG. 6 shows the FT-IR spectra of [EMIM]$CF_3SO_3$ at different exposure times exposed to a gas stream containing NO (6% v/v), $O_2$ (8% v/v) and water (~1% v/v).

FIG. 6 regarding [EMIM][$CF_3SO_3$] shows that the oxidation reaction still proceeded forming $HNO_3$, but slower than with the acetate, nitrate- and chloride-based ILs. Notably, the strong bands from nitrate was not observed after desorption, whereas the strong bands originating from the triflate anion were observed throughout the experiment. The latter bands only changed moderately after accumulation of $HNO_3$ in the IL, suggesting that hydrogen bonding of $HNO_3$ to the anion was present but less pronounced than observed in the experiments with the nitrate IL. Hence, the strong triflate band centered at 1270 $cm^{-1}$ (antisym. S=O stretch) lost intensity and broadened when $HNO_3$ was present but regained intensity after desorption.

In order to probe the influence of the cation on the reaction, and to determine if the observed uptake was due to

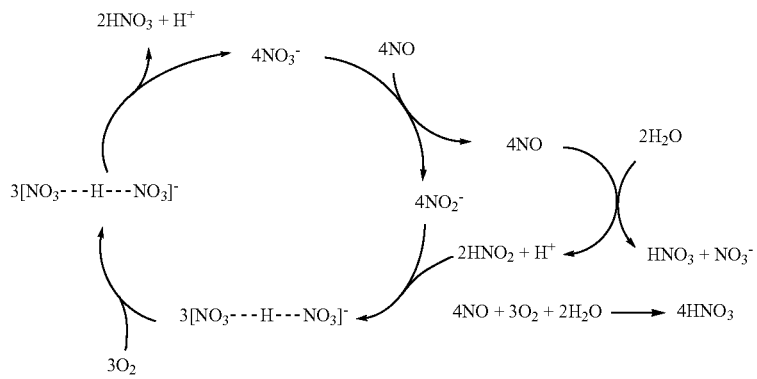

As seen from the proposed reaction pathway, we believe that radicals originating from dioxygen are not formed during the turnover of the reaction. The fact that the organic cations are unaffected by the harsh treatment is also a strong indication that the formation of uncontrollable reactive radical species is suppressed in the IL media. Any other, less protected, organic molecules or particles present in the IL are likely oxidized and decomposed completely to $CO_2$ and water giving a self-cleaning process of the IL during heating to the regeneration temperature.

Figure 2:
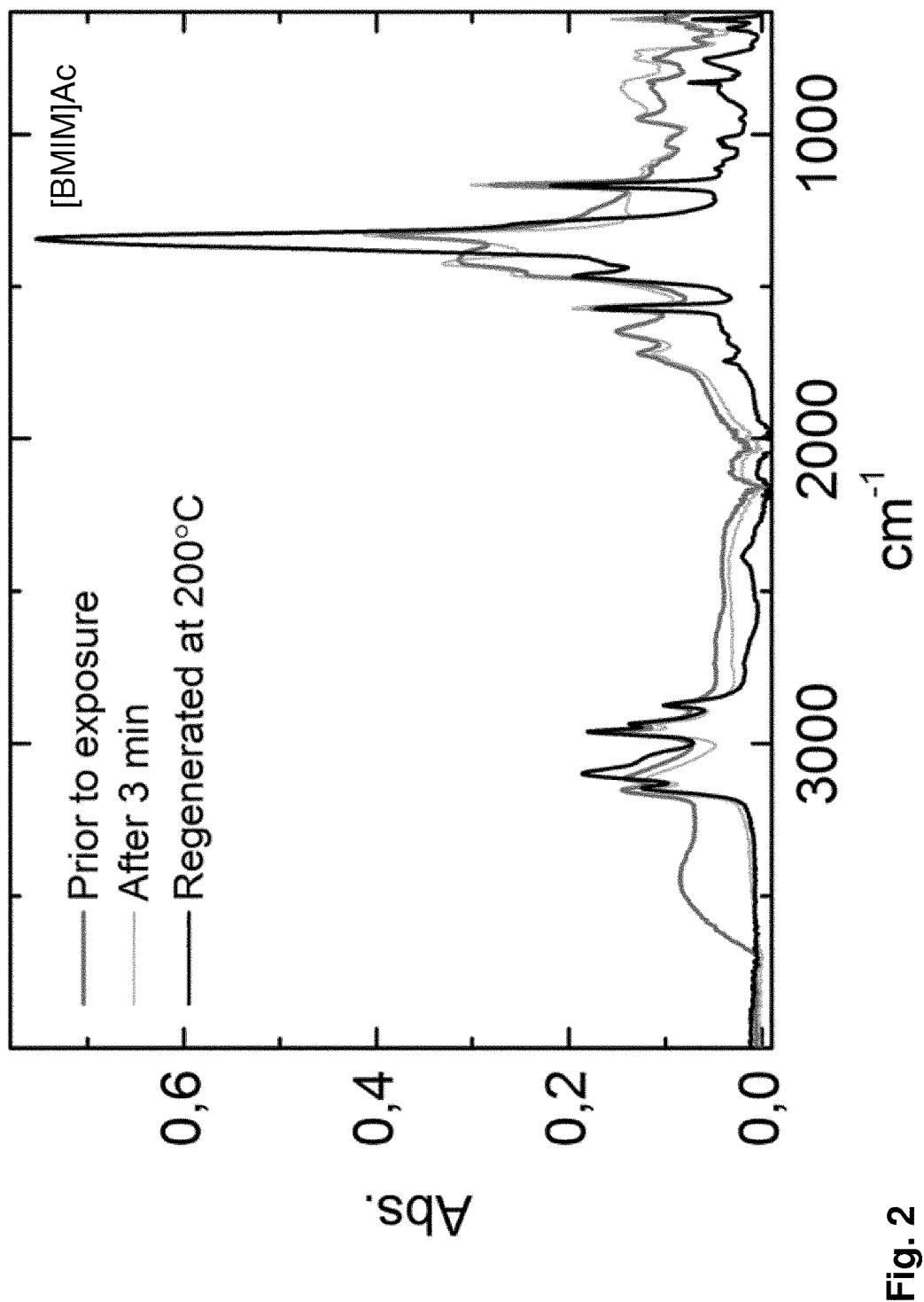
FIG. 2 shows the FT-IR spectra of [BMIM]$CH_3COO$ at different exposure times.
Figure 10:
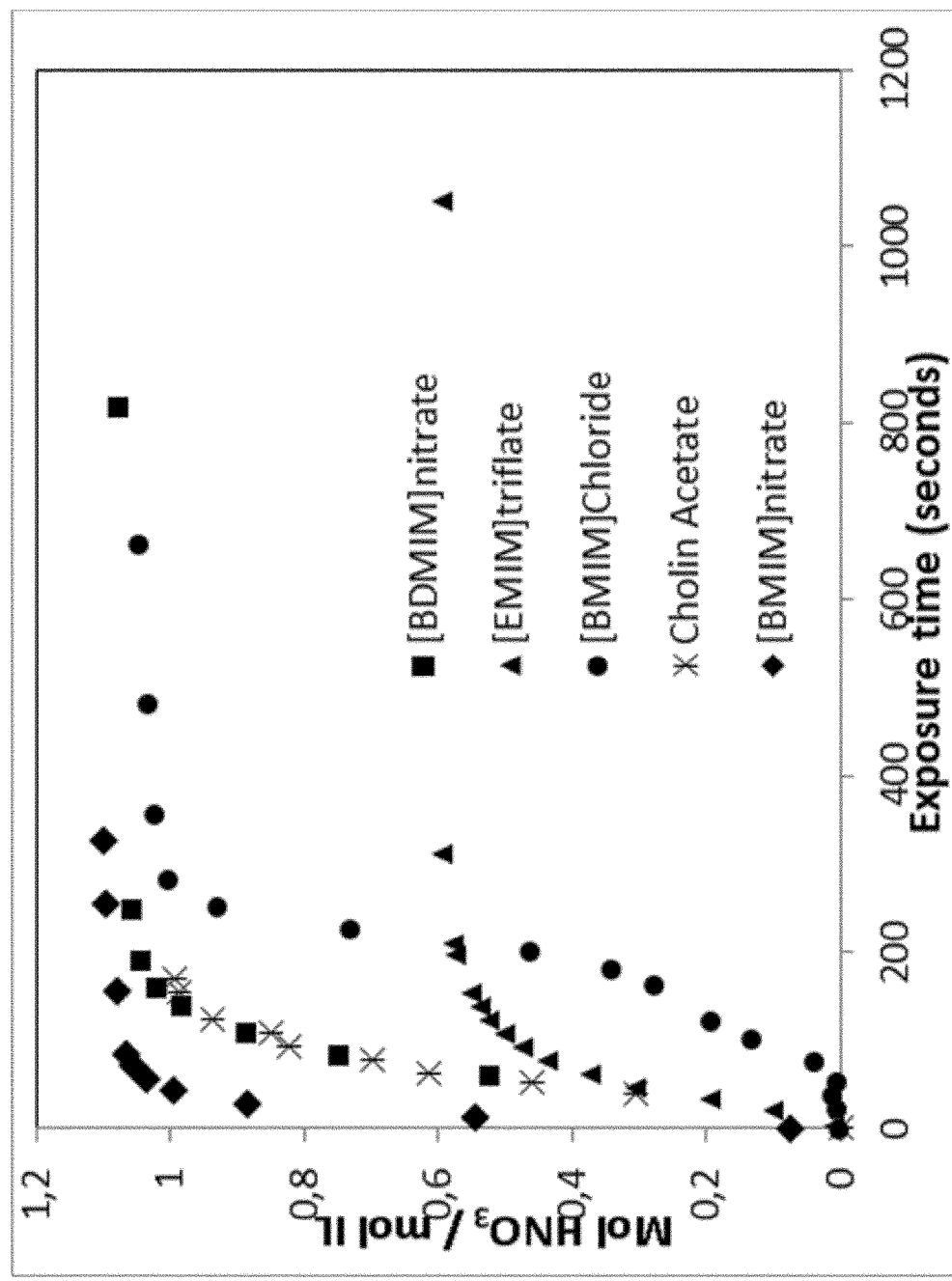
FIG. 10 shows the observed amount of $HNO_3$ per mol IL for different ionic composition catalysts.
Figure 13:
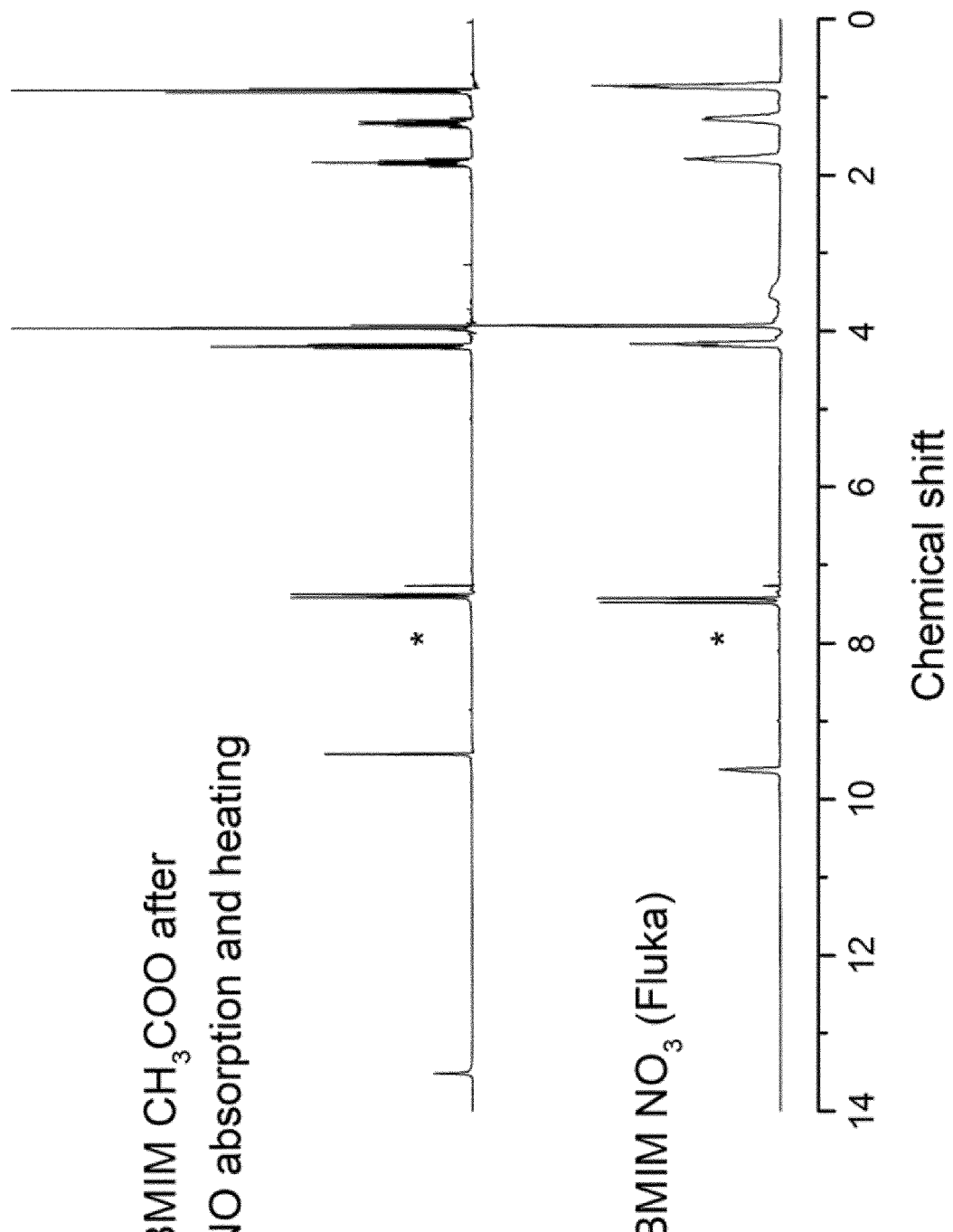
FIG. 13 shows the $^1H$ data in $CDCl_3$ of [BMIM]acetate after NO absorption and desorption. No peaks from acetate or acetic acid are discernible ($CH_3$ group of acetate has a peak at 2.10 ppm in $CDCl_3$).

The ILs with anions which are stronger bases than nitrate will be converted to the nitrate IL after one cycle where the corresponding acid is expelled. For example, acetate is a very powerful base in an IL and if an experiment is performed on [BMIM]$CH_3COO$ (1-butyl-3-methylimidazolium acetate), the IR features assignable to acetate decrease rapidly and acetic acid can be seen in the IR spectrum of [BMIM]$CH_3COO$ as shown in FIG. 2. The band assignable to acetic acid quickly disappears, suggesting that the acid is expelled from the IL. Simultaneously, the anion changes towards the nitrate-nitric acid dimeric species discussed above. The new anion changes the physical properties of the IL drastically since [BMIM]$NO_3$ (see FIG. 4) has a much lower viscosity and a higher thermal stability than [BMIM]$CH_3COO$, see FIG. 13 showing the TGA data.

reaction with the C2 position of the cation, [BMIM]$^+$ was exchanged for [BMMIM]$^+$ (1-butyl-2,3-dimethylimidazolium) possessing an extra methyl group in the C2 position on the imidazolium ring. Comparing the IR spectra of [BMIM]$NO_3$ at different times after NO exposure in FIG. 4a with the IR spectra of [BMMIM]$NO_3$ at different times after NO exposure in FIG. 5, it can be seen that the additional methyl group makes little difference on the absorption rate and total capacity. This can also be seen in FIG. 10 displaying the observed amount of $HNO_3$ per mol IL. In FIG. 10, there is a small difference in the reaction rates, however this is likely due to the [BMIM]$NO_3$ experiments being performed at a later point in time, where the method had been optimized to better study the reaction kinetics. The term [BDMIM] is used interchangeably with [BMMIM]. Acetate is the strongest base and the corresponding acid (acetic acid) is easily driven off giving a curve identical to the one for [BMIM] nitrate.

In order to assess the importance of the imidazolium ring, the simpler, biodegradable and nontoxic choline cation was used. This posed some problems in the quantification since IR peaks from the cation are found at the same positions as one of the quantifiable $HNO_3$ bands. The same trends as described above are also seen in FIG. 7, showing the IR spectra of choline acetate ((2-hydroxyethyl)trimethylammonium) acetate) at different times after NO exposure. As with the [BMIM] based ILs, oxidation of NO and subsequent absorption of the end product, HNO₃, is observed. Upon regeneration of the IL facilitated by heating, the nitrate IL is observed as the only product. The reaction intermediates observed during reaction are consistent with the ones observed during reaction with [BMIM] based ILs, presented in the catalytic cycle above. Thus it can be concluded that the chosen cation has no apparent influence on the observed reaction rate nor the reaction mechanism.

Figure 19:
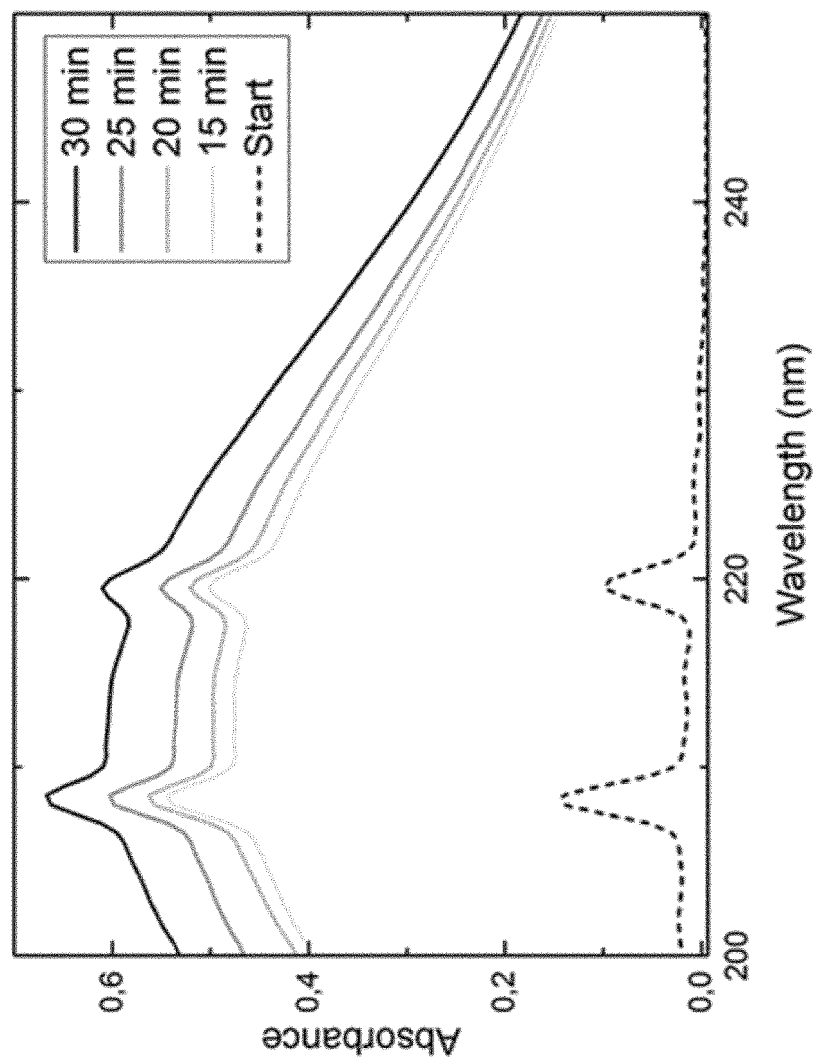
FIG. 19 shows UV-Vis spectrum showing oxidation of NO to form $NO_2$. A SILP catalyst (30% porefilling, BMIM $NO_3$ on uncalcinated silica (Saint Gobain SS138)), situated in a fixed bed reactor with a temperature of 70° C. was exposed to a continuous flow of simulated flue gas containing 900 ppm $H_2O$, 2000 ppm NO, 15% O2 and balance $N_2$.

The rate of accumulation of nitric acid in the IL is very dependent on the NO concentration and also on the temperature as can be seen in FIGS. 1 and 19. At room temperature and 6% v/v NO, the reaction proceeded quickly, and saturation was obtained after only 50 seconds. At 1% v/v NO it took more than 3000 seconds before saturation was obtained, in good accordance with the reaction being second order in NO. A second order reaction in NO is far from optimal, given that most flue gasses contain 300-1000 ppm of $NO_x$ (often in the low end). The rate equation for formation of nitric acid is described in the below equation:

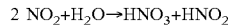

$$r=k^*[NO]^2*[O_2]=k^*p_{NO}^2*p_O$$

As is seen from the rate equation, a second order dependence means that the NO concentration is squared. This gives a sharp decrease in $HNO_3$ formation with decreasing NO concentration.

Figure 16:
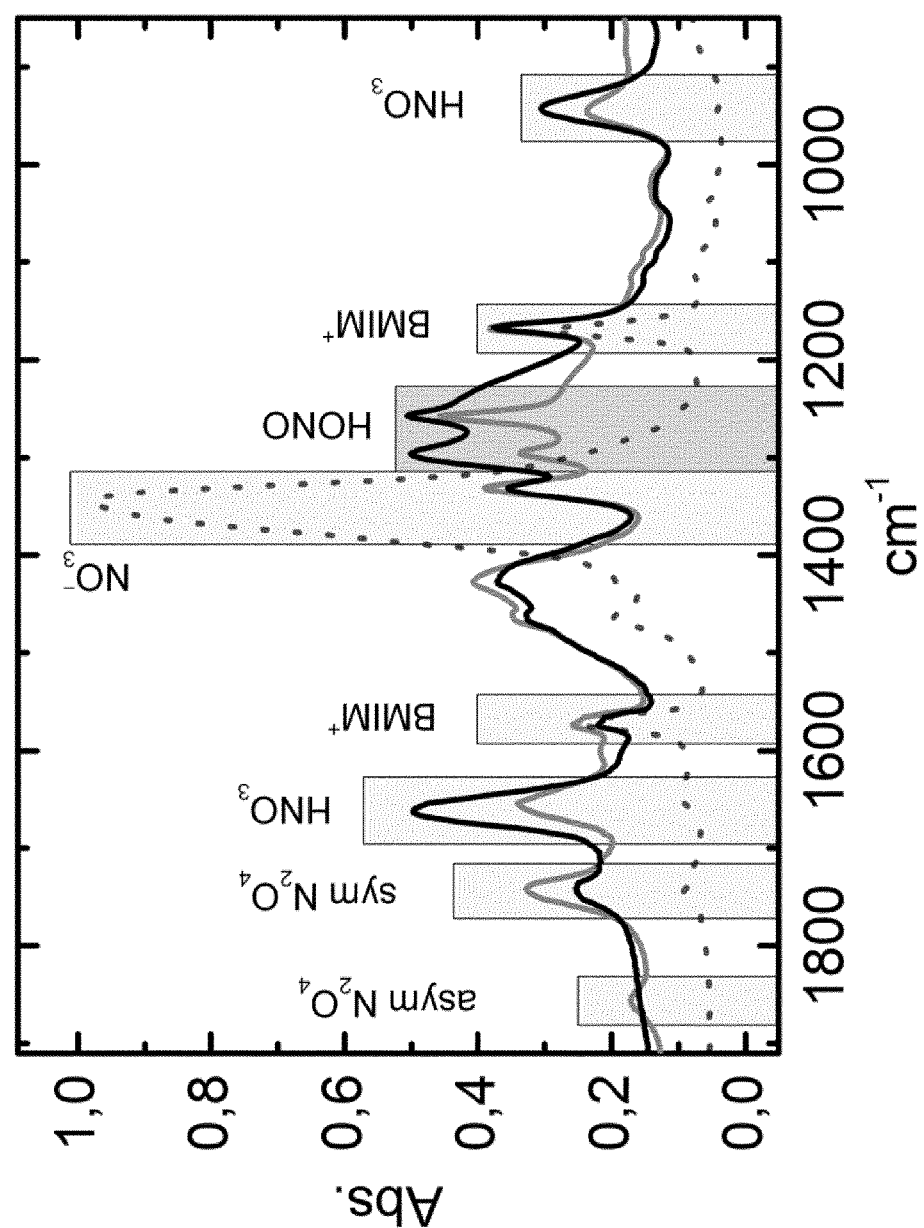
FIG. 16 shows an ATR-FTIR spectrum of [BMIM][$NO_3$] exposed to a gas stream containing $NO_2$. The dotted line corresponds to the spectrum of pure IL in equilibrium with the atmosphere, the grey lines to the spectra recorded after $NO_2$ exposure for 3 min and the black line to the spectrum recorded after subsequent 30 s of exposure to $N_2$ saturated with water. Bands from BMIM+, $N_2O_4$, $NO_3^-$, $HNO_3$ and HONO are indicated.

By preoxidizing the NO, the reaction order for the rate determining absorption step can be reduced, thus increasing the reaction rate significantly at lower concentrations. The spontaneous reaction between water and $NO_2$ to form nitric acid is used e.g. in the Ostwald process to produce nitric acid on an industrial scale. The reaction proceeds as: $NO_2+H_2O \rightarrow HNO_3+HNO_2$, and is facilitated by liquid water present in the reactor. The IL is an excellent facilitator for this reaction, which is seen from FIG. 16. Here, the IL has been exposed to pure, dried $NO_2$ gas. The IL still contained some water, resulting in almost instantaneous formation of nitric acid, as seen from the bands at 940 cm⁻¹ and 1660 cm⁻¹. Bands assignable to $N_2O_4$ are also present in high amounts, suggesting that water is a limiting factor.

After a couple of minutes, the IL was exposed to an $N_2$ gas saturated with water. This resulted in further formation of nitric acid, while the concentration of $N_2O_4$ decreased significantly. The bands assignable to HONO follows the $HNO_3$ bands, strongly suggesting that the following reaction takes place:

$$2\ NO_2+H_2O \rightarrow HNO_3+HNO_2 \quad [18]$$

The accumulation of HONO ($HNO_2$) suggests that oxygen became the limiting factor once water was provided, as expected. The intensity of the nitric acid bands show that a large amount of $HNO_3$ can be formed without performing the rate-limiting oxidation, when the $NO_x$ is provided as $NO_2$ or higher $NO_x$ species. Thus, the rate equation will change and the dependency on $NO_x$ concentration will decrease significantly, likely to or below 1.

A decrease in reaction order under the low concentrations found in a flue gas, will increase the reaction rate by several orders of magnitude. As an example; if the $NO_x$ concentration is 500 ppm and the reaction order in $NO_x$ is 1 instead of 2, the rate of formation for $HNO_3$ would increase by 2000.

Figure 17:
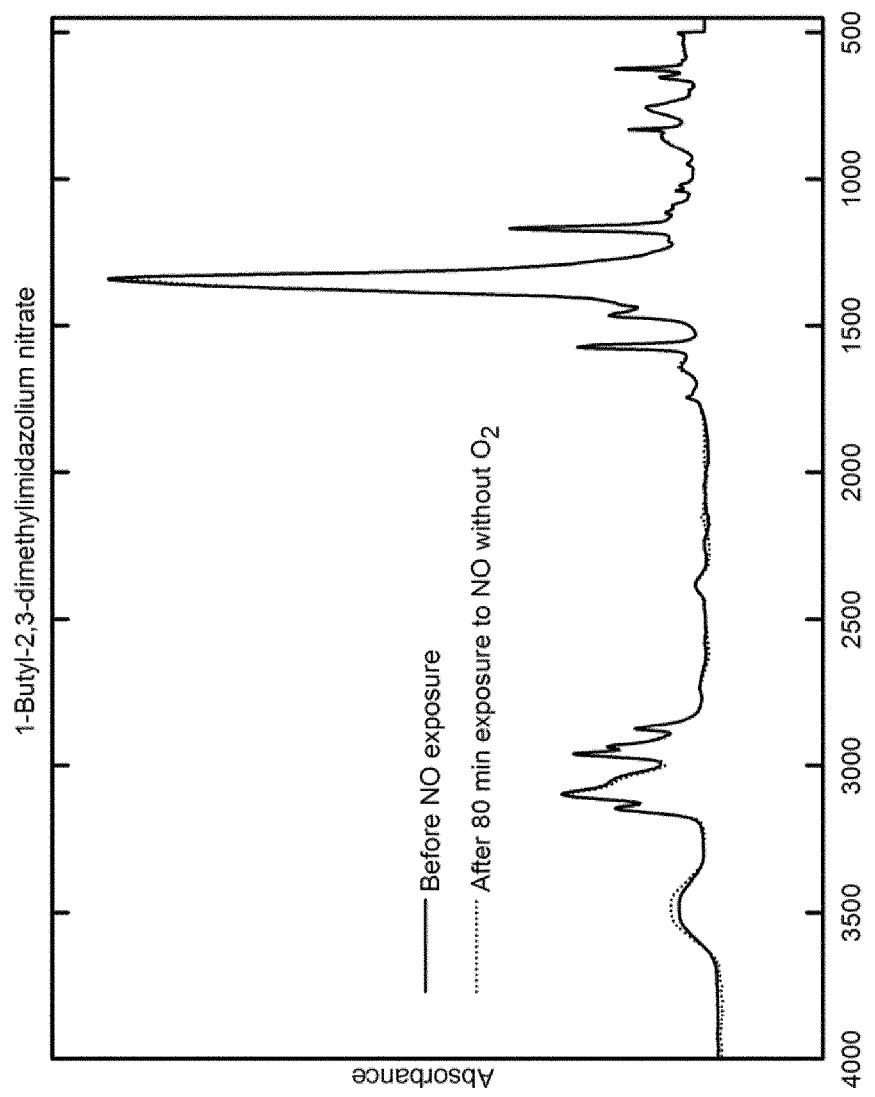
FIG. 17 shows ATR-FTIR spectra showing [BMIM]$NO_3$ prior to exposure (solid black line) and after exposure to a mixture of NO 10% v/v, $H_2O$ 2% v/v and balance $N_2$. The spectra are identical apart from a slight increase in water concentration (band at 3500 cm−1), causing a slight decrease in the free nitrate signal (band at 1340 cm−1) due to hydrogen bonding.

When the IL is exposed to NO and water in the absence of oxygen, no reaction occurs, further underlining the importance of pre-oxidation. This can be seen from FIG. 17, in which the IL was exposed to a wet mixture of NO and water for more than an hour without any reaction occurring. This is opposed to significant reaction occurring after 30 seconds with $NO_2$.

Figure 18:
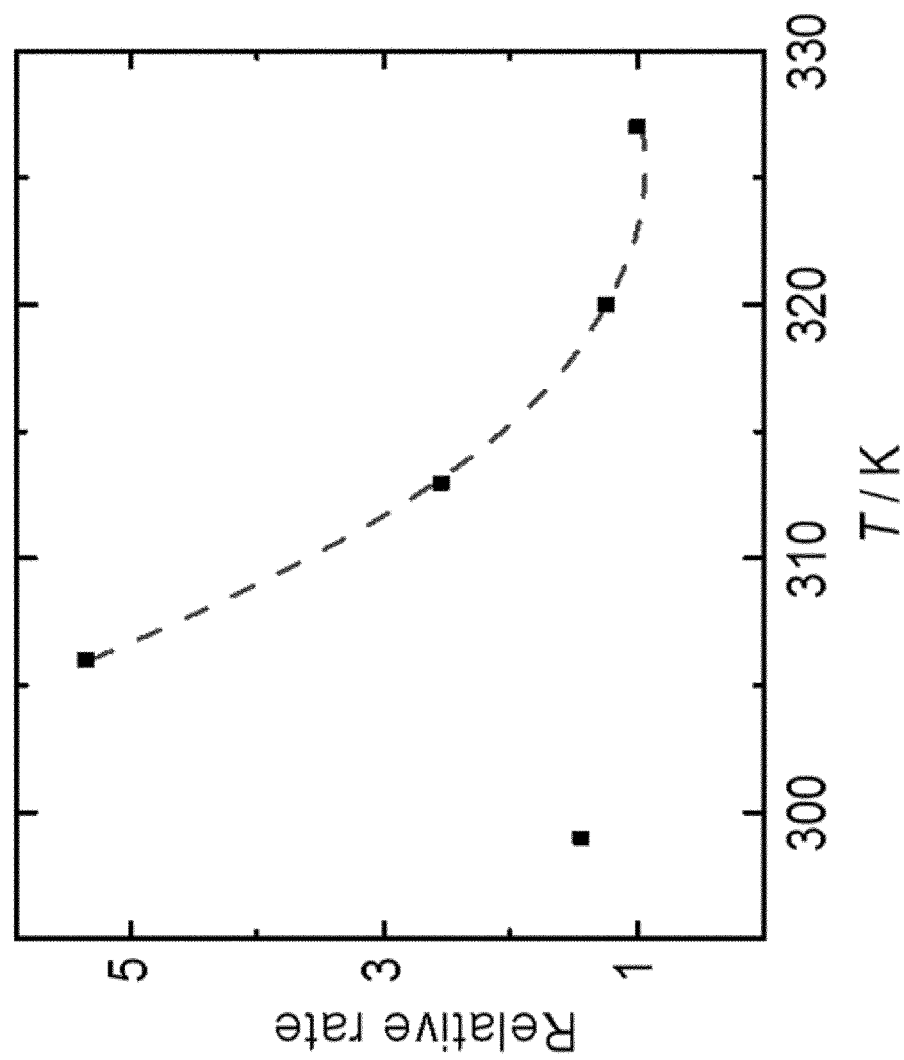
FIG. 18 shows relative rate of $HNO_3$ formation in [BMIM][$NO_3$] with 2% v/v NO with excess water and oxygen at different temperatures. A dotted line is added as a guide to the eye. Rates are determined as the maximal linear rate of the change in intensity of the 948 cm−−1 band in the in-situ ATR-FTIR spectra.

Increasing the temperature slightly is expected to also increase the rate of the limiting oxidation reaction. FIG. 18 shows the effect of increasing the temperature slightly. As can be seen from FIG. 18, there is a large gain from doing so, starting out. At higher temperatures the rate decreases again, suggesting that another factor becomes rate limiting. This factor is likely solubility of the gaseous species in the IL, which decreases with temperature. Thus, the reaction can be improved drastically by performing the oxidation at higher temperatures, while having a low temperature absorption bed, in which the solubility is improved.

Protons are being formed in the oxidation reaction and since the proton conductivity is very high in ionic liquids they might quickly be led away from the surface. When the IL is saturated with $HNO_3$ there are just enough protons to allow every proton to form a strong hydrogen bond between two nitrate anions. This is also supported by the observation that no water is accumulated in the IL after saturation.

FIG. 19 shows the UV-Vis spectra for oxidation of NO to form $NO_2$. A SILP catalyst (30% porefilling, BMIM NO3 on uncalcinated silica (Saint Gobain SS138)), situated in a fixed bed reactor with a temperature of 70° C. was exposed to a continuous flow of simulated flue gas containing 900 ppm $H_2O$, 2000 ppm NO, 15% $O_2$ and balance $N_2$. The broad band with maximum at 210 (215) nm is characteristic for $NO_2$ and increases with time, thus indicating that a significant amount of $NO_2$ is formed. After 30 minutes, steady state is reached. The continuous conversion of NO at steady state corresponds to around 70%, based on the characteristic NO peak at 119 (124) nm. The numbers presented in parentheses correspond to the table values for the species. The deviation from table values is caused by a constant instrument effect. There is a significant activation period where no significant NO oxidation is observed. After this induction period, the conversion appears to remain constant.

Figure 20:
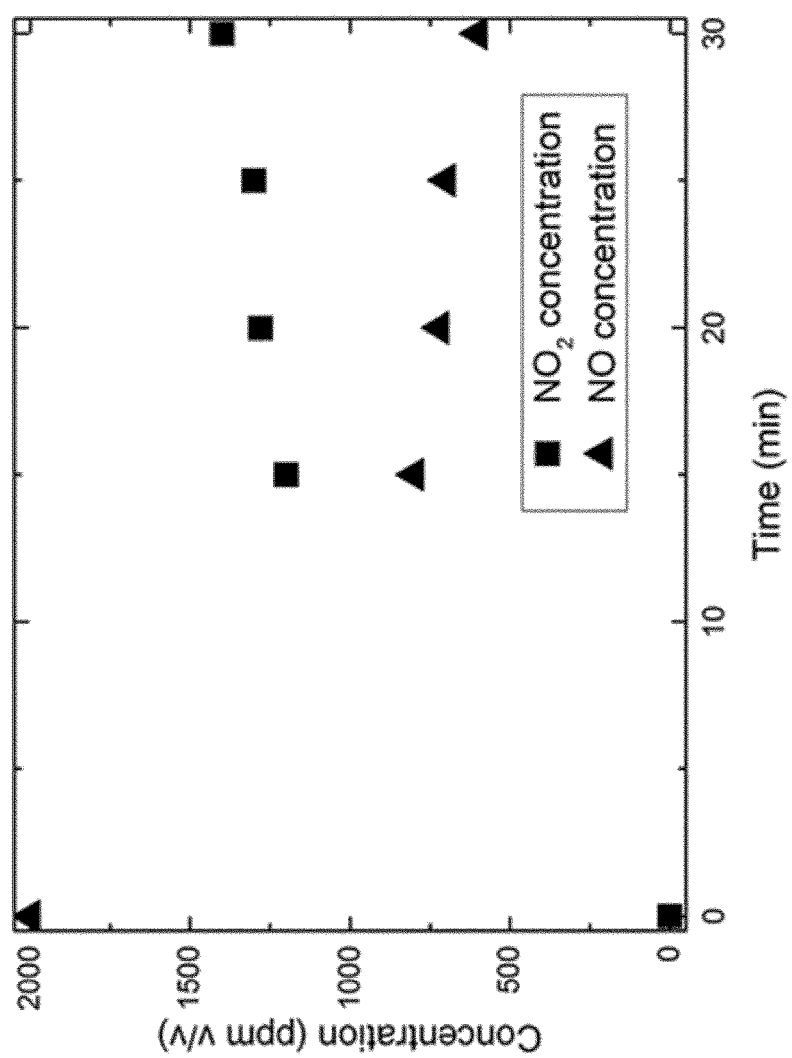
FIG. 20 shows concentration profiles corresponding to the spectra presented in FIG. 19.

FIG. 20 shows the concentration profiles corresponding to the spectra presented in FIG. 19. The concentrations have been determined for NO by deconvolution of the spectral information, using the same method as presented earlier. UV/VIS spectroscopy is not optimal for quantification of $NO_2$, however, no trace of other NOx species was observed. Therefore, it is assumed that the $NO_2$ concentration can be determined from the NO conversion; ([$NO_2$]=2000 ppm−[NO]). This assumption is further justified by looking at the spectral data, which clearly shows high concentrations of $NO_2$.

Figure 21:
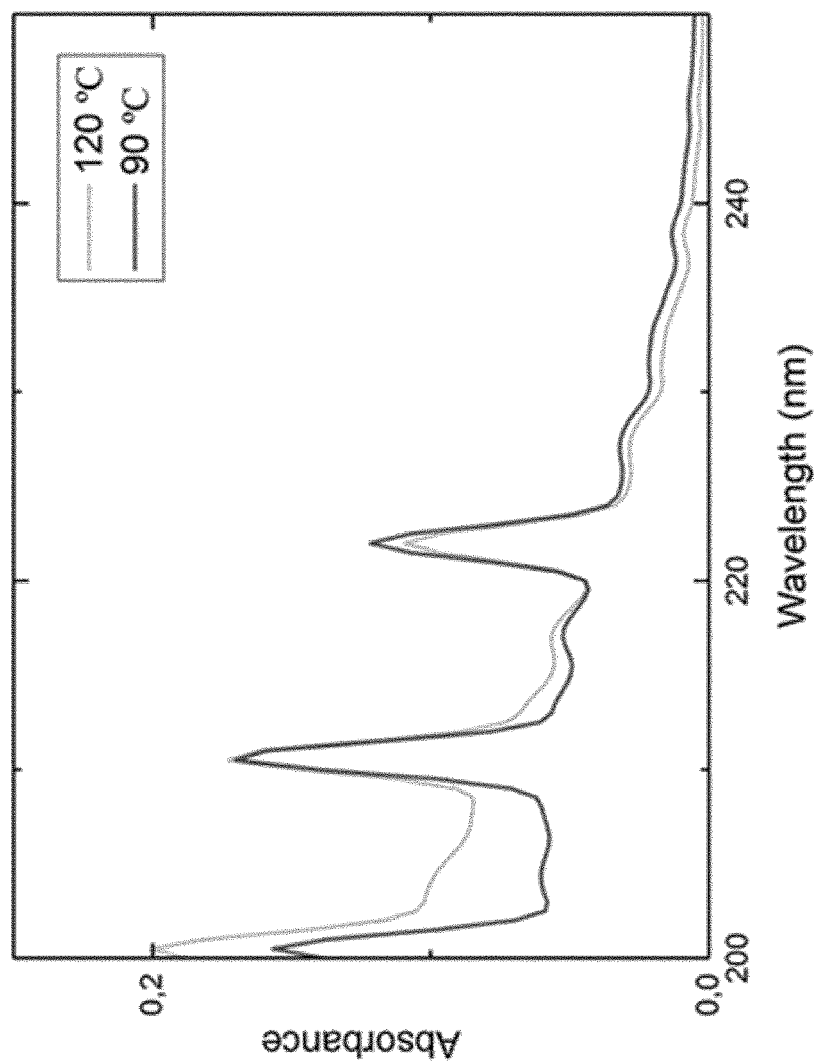
FIG. 21 shows UV-Vis spectrum showing oxidation of NO to higher NOx species. A SILP catalyst (30% pore filling, BMIM NO3 on calcinated anatase (Saint Gobain ST120)), situated in a fixed bed reactor with a temperature of 90° C. and 120° C. was exposed to a continuous flow of simulated flue gas containing 1% $H_2O$, 2000 ppm NO, 15% $O_2$ and balance $N_2$.

FIG. 21 shows an UV-Vis spectrum showing oxidation of NO to higher NOx species. A SILP catalyst (30% pore filling, BMIM NO3 on calcinated anatase (Saint Gobain ST120)), situated in a fixed bed reactor with a temperature of 90° C. and 120° C. was exposed to a continuous flow of simulated flue gas containing 1% $H_2O$, 2000 ppm NO, 15% $O_2$ and balance $N_2$. At 90° C., the primary oxidation product is $NO_2$, as can be seen from the broad band with maximum at 210 (215) nm. At 120° C., formation of another NOx species is observed, while the concentration of $NO_2$ seems to decrease. The NOx species has a broad peak with a peak maximum at an estimated 190 (195) nm, corresponding to that of $N_2O_5$. The peak maximum of this new NOx species can only be estimated as it is just outside the spectral range. The continuous conversion of NO at 120° C. corresponds to around 35%, based on the characteristic NO peak at 119 (124) nm. At 90° C., this number is around 20%. The numbers presented in parentheses correspond to the table values for the species. The deviation from table values is caused by a constant instrument effect.

The ILs do not decompose even when heated above 120° in concentrated nitric acid. The original IR spectrum of the IL is completely recovered after cooling to room temperature even after many cycles if the gas stream contains water, as can be seen in FIGS. 4, 5, 6, and 8. If kept completely dry and warm for longer periods some yellow coloration is observed, but the IL still absorbs NO subsequent runs.

The imidazolium ring is well protected from electrophilic attack of $NO_2^+$ or similar species by the positive charge on the imidazolium ring. As seen from the proposed reaction pathway, radicals originating from dioxygen are not expected to form during the reaction—at least not under the conditions used here. The fact that the organic cation survives the harsh treatment is a strong indication that the formation of uncontrollable reactive radical species is suppressed in the ionic liquid media.

Figure 11:
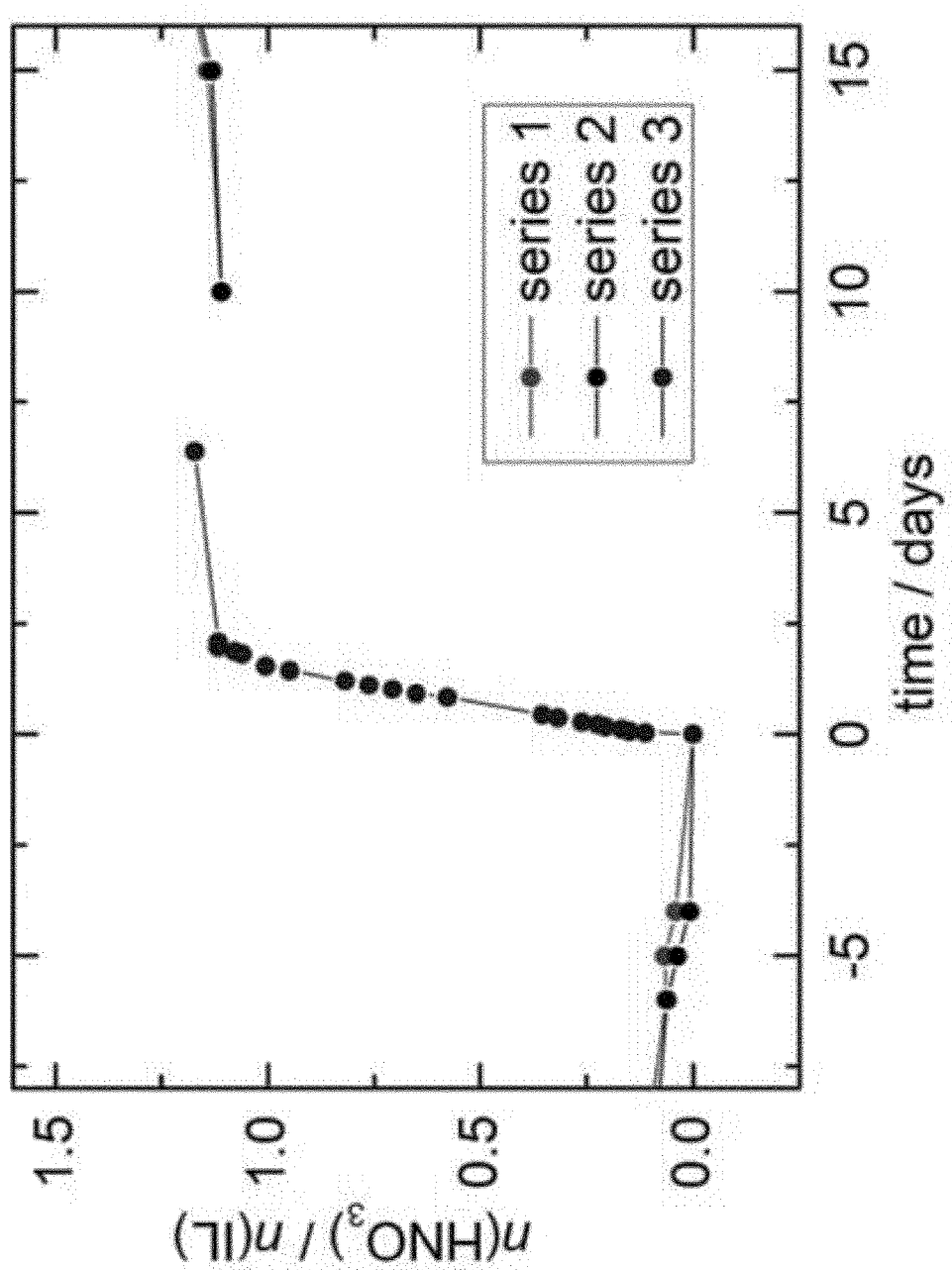
FIG. 11 shows the absorption of NO performed on bulk [BMIM]$CH_3COO$ with 10% NO in $N_2$ being bubbled through 1 g of IL.
Figure 12:
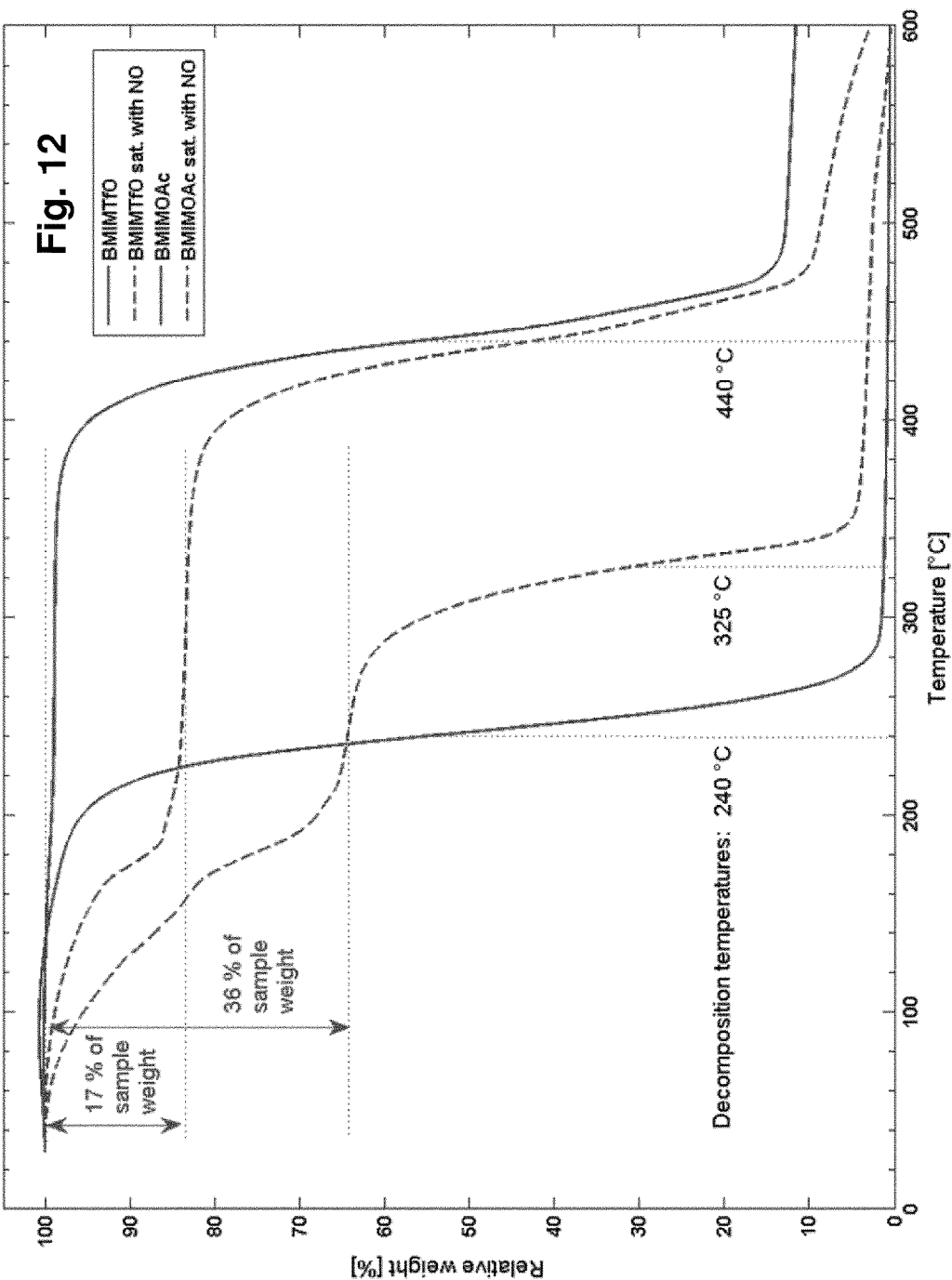
FIG. 12 shows the TGA data.

The absorption of NO has also been performed on bulk [BMIM]$CH_3$COO and [BMIM]$NO_3$. For the [BMIM]$CH_3$COO 10% v/v NO in $N_2$ was bubbled through 1 g of IL resulting in the gravimetric data shown in FIG. 11. For the [BMIM]$NO_3$, water and air was added so the NO concentration was 5% v/v, with 10% v/v $O_2$ and around 1% $H_2O$ v/v. The reactions were followed gravimetrically and the observations are in accordance with the conclusions drawn from the FTIR data. The weight increase after cooling to room temperature corresponds to 1.3 mol $HNO_3$ per mol IL. The acetic acid is easily lost as shown by the NMR data in FIGS. 13 and 14. The viscosity and the thermal stability of the IL changed drastically after absorption. See the TGA data in FIG. 12 for the thermal stability changes.

Figure 14:
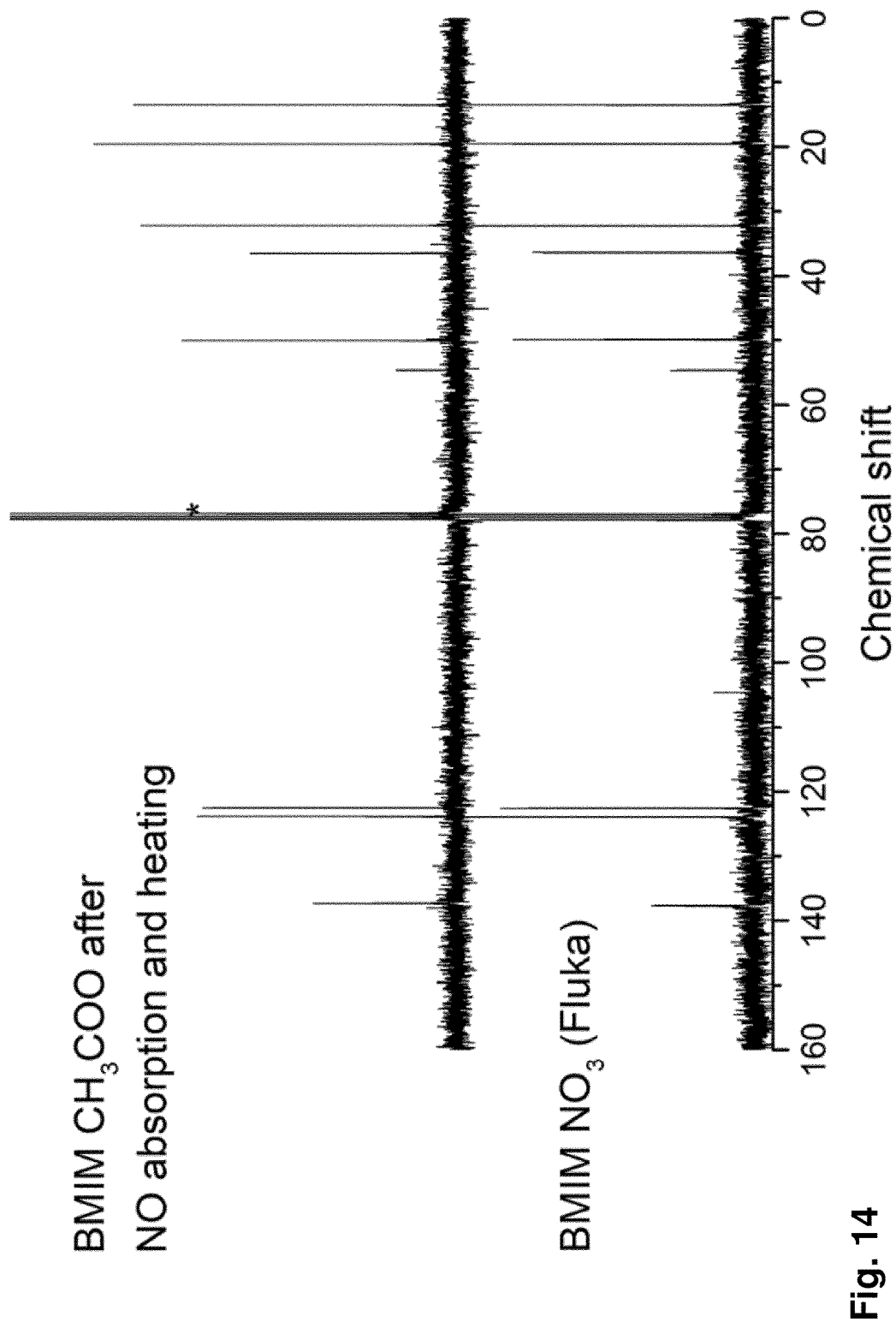
FIG. 14 shows the $^{13}C$ NMR data of [BMIM]acetate. No peaks from acetate or acetic acid are discernible ($CH_3$ group of acetate has a peak at 20.81 ppm, $COO^-$ group of acetate has a peak at 175.99 ppm in $CDCl_3$).

$^1$H and $^{13}$C NMR clearly shows that very acidic protons (13.8 ppm) are present and any signals corresponding to acetic acid or acetate are lost after one heating cycle. This is seen in FIGS. 13 and 14.

Figure 5:
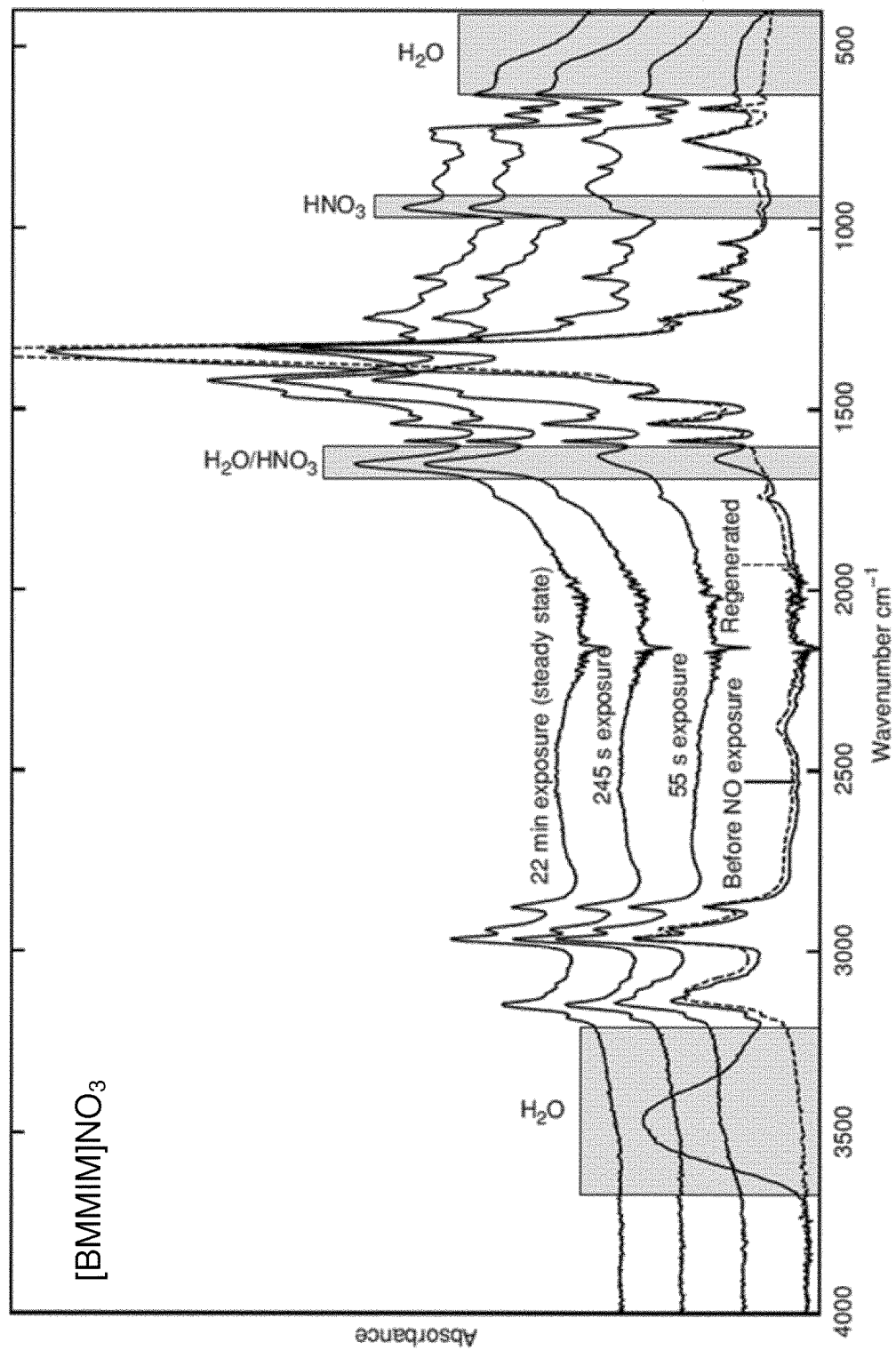
FIG. 5 shows the FT-IR spectra of [BMMIM]$NO_3$ at different exposure times.
Figure 7:
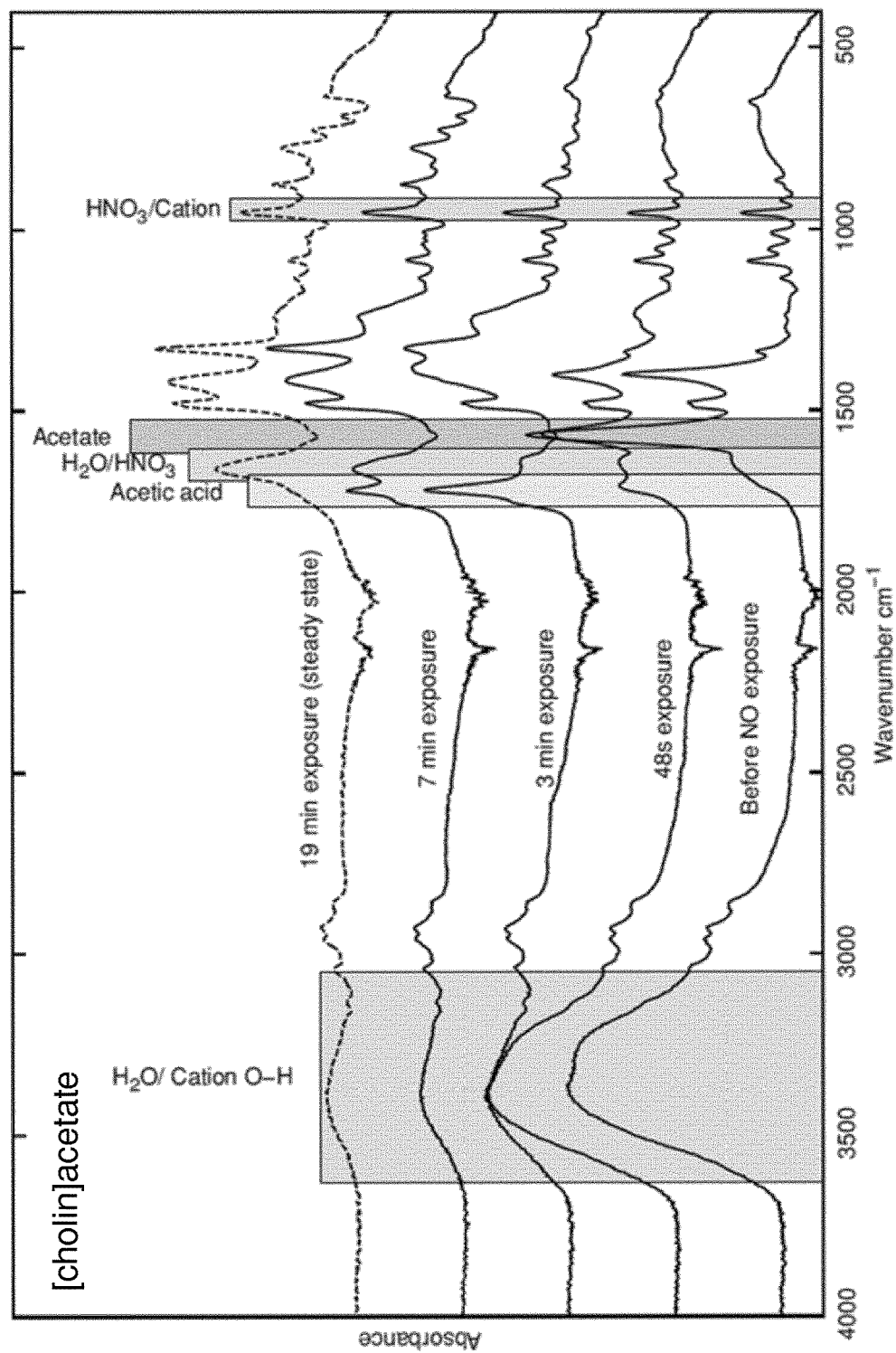
FIG. 7 shows the FT-IR spectra of [choline]$CH_3COO$ at different exposure times.
Figure 8:
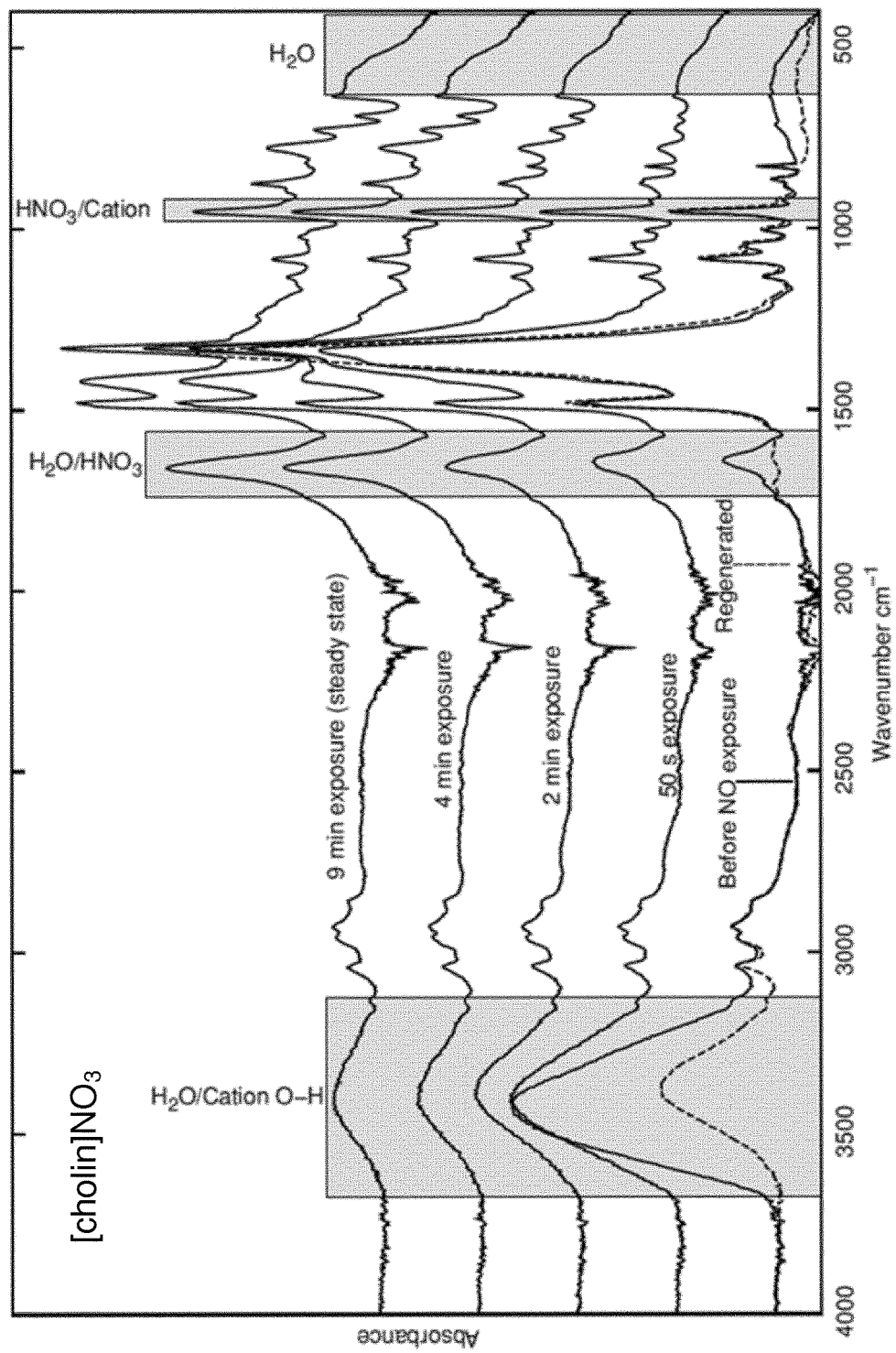
FIG. 8 shows the FT-IR spectra of [choline]$NO_3$ at different exposure times.
Figure 9:
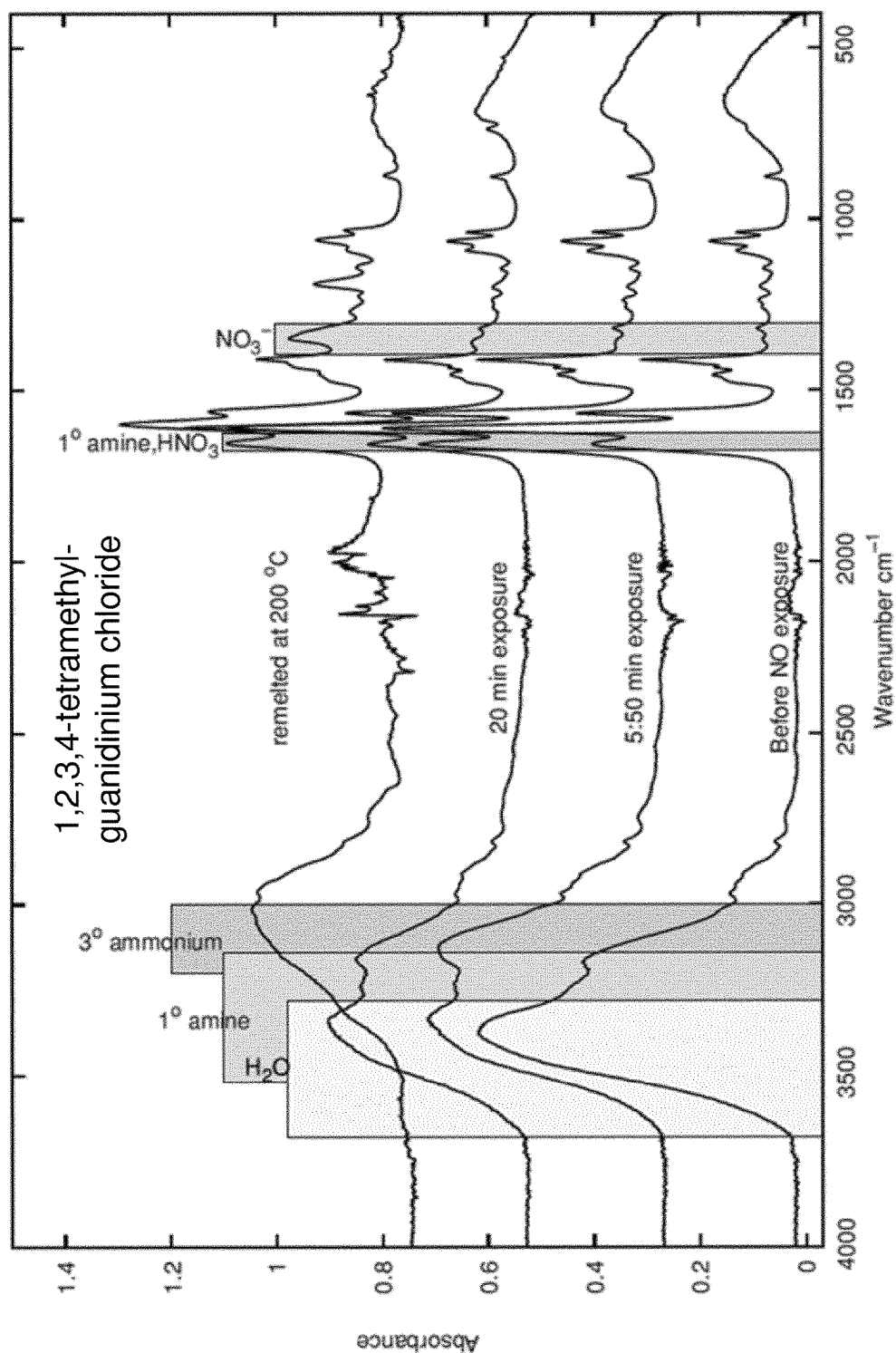
FIG. 9 shows the FT-IR spectra of 1,2,3,4-tetramethylguanidinium chloride at different exposure times.

The FTIR spectroscopic results for running a combined gas stream of dilute NO and atmospheric air saturated with water over a thin film of a series of ionic liquids are show in FIG. 2 for [BMIM]$CH_3$COO, FIG. 3 for [BMIM]Cl, FIG. 4a for [BMIM]$NO_3$, FIG. 5 for [BMMIM]$NO_3$, FIG. 6 for [EMIM]$CF_3SO_3$, FIG. 7 for [choline]$CH_3$COO, FIG. 8 for [choline]$NO_3$ and FIG. 9 for 1,2,3,4-tetramethyl-guanidinium chloride. The reactions are followed in real time with FTIR by recording spectra every few seconds. The different relevant species that can be observed in this experiment are: nitrate (1340 $cm^{-1}$), nitric acid (940 $cm^{-1}$ and 1660 $cm^{-1}$), water (3350 $cm^{-1}$ and 1655 $cm^{-1}$), acetate (1540 $cm^{-1}$), and acetic acid (1700 $cm^{-1}$).

Figure 4B:
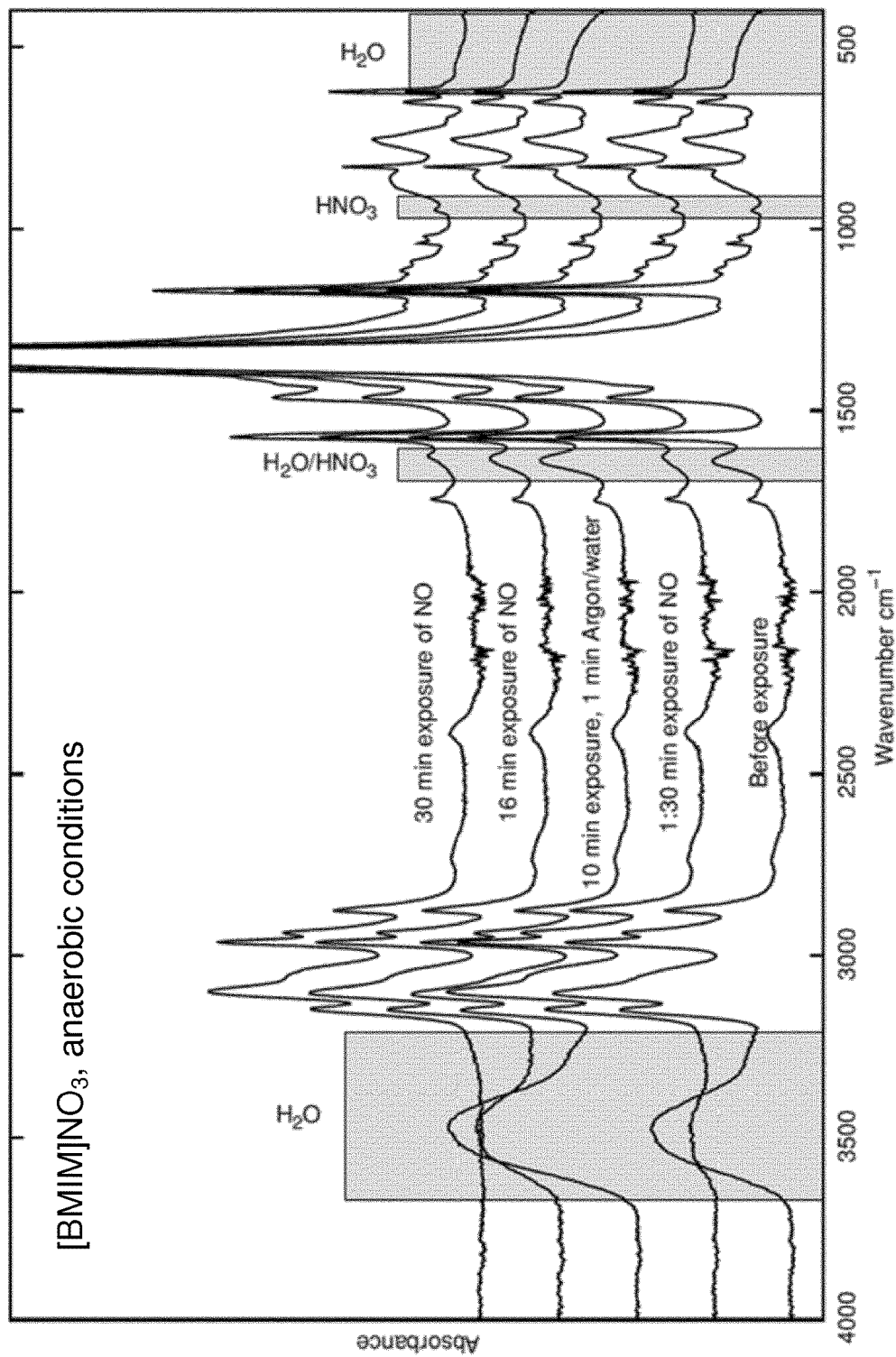
FIG. 4b shows the FT-IR spectra of [BMMIM]$NO_3$ at different exposure times under anaerobe conditions and FIG. 4c shows the FT-IR spectra of [BMMIM]$NO_3$ mixed with $HNO_3$ at different molar ratios.
Figure 4C:
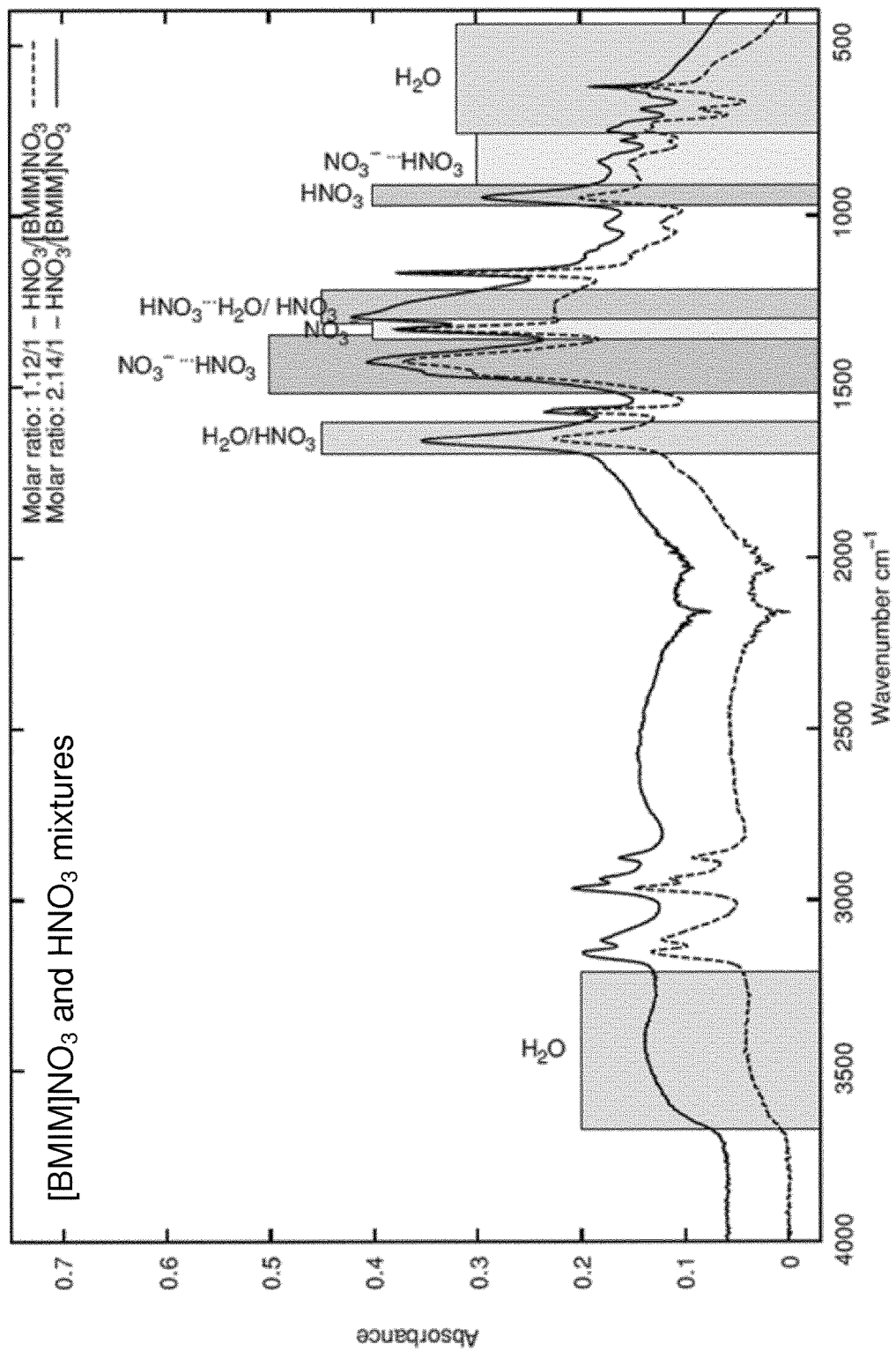

In the experiment with [BMIM]$NO_3$ in FIGS. 4a and 4b, we see an immediate decrease in the strong band at 1340 $cm^{-1}$ originating from the asymmetric O—N stretch of the nitrate ion as acidic protons are building up and generating less symmetric species. Within 20 seconds, the characteristic peak of the $HNO_3$ molecule at 940 $cm^{-1}$ increases as seen in FIG. 4a. This line corresponds to the symmetric O=N=O bending mode. Since it remains unchanged if H is substituted for D, it must correspond to the oxygens not directly bonded to H.

The other characteristic peak at 1660 $cm^{-1}$ shifts with deuterium substitution and corresponds to a combination band consisting of the asymmetric O=N=O stretch combined with the O—H/D bend. Either of the lines (940 $cm^{-1}$ and 1660 $cm^{-1}$) can be used to quantify the amount of $HNO_3$ present in the ionic liquid by Gaussian peak analysis and integration (not shown here). The results of the line at 940 $cm^{-1}$ were slightly more reproducible, but all conclusions are equally valid from the quantifications of the 1660 $cm^{-1}$ line. These bands are illustrated in FIG. 15.

In order to accurately determine the nitric acid concentrations in the IL during raction, we used standard solutions prepared by dissolving known amounts of concentrated nitric acid in [BMIM]$NO_3$, measuring the IR spectrum and creating a standard curve. The integrated peaks of the measurement series were then compared in every point with the standard curve to give the results as molar ratios of $HNO_3$ to IL.

Desorption takes place when the IL is heated above 120° C. corresponding well to the boiling point of concentrated aqueous nitric acid of 121° C. The FTIR spectrum of the IL in FIGS. 5-6 and 8 is unchanged from the original spectrum when returning to room temperature, except for water content, and a new cycle can be performed. From the NMR study shown in FIGS. 13 and 14, it is evident that the IL still retains some acidic protons when only desorbed at 120° C.

The reaction rate of the combined absorption and oxidation was determined from Gaussian fitting performed on ATR-FTIR data. The Gaussian fit was performed using GnuPlot 4.6.

The reason for using Gaussian curves is that spectroscopic data stems from quantized intramolecular motions that are distributed almost evenly around a top point. This distribution corresponds somewhat to a Gaussian distribution and can therefore be simulated using Gaussian functions. Once the spectrum is dissolved into its individual components, the area beneath the individual Gaussian curves will correspond to the concentration of that component. The Gaussian fit is performed by iterations, changing one parameter at a time until the difference between the real spectrum and the simulated spectrum is insignificant.

The Gaussian fit was performed in the spectral range from 800 $cm^{-1}$ to 1100 $cm^{-1}$. Concentration of the nitric acid formed during reaction was determined based on the peak at 940 $cm^{-1}$.

Experimental Details

In-Situ ATR-FTIR Spectroscopy

The FT-IR Measurements was performed on a heatable diamond ATR plate (Pike GladiATR) using a Nicolet iS5 spectrometer. In order to control the atmosphere over the ionic liquid film on the ATR crystal, a stainless steel cap with a heat resistance polymer sealing was constructed. The steel cap was supplied with two fittings of in- and outlet gas. The inside volume of the cap was approximately 2 millilitre (mL). The ATR cell could be heated up to 300° C. In the first three examples 8 scans with a resolution of 4 $cm^{-1}$ was used to record each spectrum. The duration of each recording was 11 seconds under these conditions. In the later examples, the number of scans was decreased to 4 lowering the recording time to 6 seconds. The spectra were ATR corrected using OMNIC Lite software, assuming a refractive index of 1.5.

The iS5 spectrometer as well as the base optics in the Pike ATR cell was purged with nitrogen in order to minimize loss of the signal to gas phase water and carbon dioxide inside the instrument.

Gases used: Argon 99.999%, Nitrogen 99.99999%, 10 vol % nitrogen oxide in nitrogen, and pressurized air. Gases used for the experiments were purchased from AGA. The gas flow was controlled with Bronkhorst mass flow controllers. In experiments with water in the gas, air or argon was bubbled through a glass frit in a flask with distilled water. The resulting water content in the gasses after saturation was calculated to 2.7 vol % from the vapor pressure at room temperature.

Deconvolutions of the ATR-IR spectra were performed with Systat Peakfit 4.12 software using the build in "Residuals" Algorithm. The typical procedure was to fit the steady state spectra with Gaussian curves allowing both width and position of each peak to move. When a good deconvolution was made on the steady state spectra the peak parameters obtained from this deconvolution was saved and used for the next spectra. Now both position and width of each peak was constrained, so only the intensity of the peaks was changed during the following deconvolutions. The concentration of $HNO_3$ was determined either from integration of the band around 1650 or 940 cm$^{-1}$ after deconvolution. In the case of water in [BMIM]Cl, the broad band at 3400 cm$^{-1}$ was used. To make an absolute estimate of the $HNO_3$ concentration a standard solution was prepared with concentrated nitric acid (68 vol %) in [BMIM]$NO_3$. The spectra of the standard solution were fitted using the same peak parameters as for the steady state spectra.

An experimental procedure to measure the NO absorption capacity by weight increase in the ILs can also be employed, wherein preliminary gas absorption is carried out in a ca. 5 ml test tube with 1 ml ionic liquid (IL) at room temperature (22-23° C.). The 10 vol % NO/$N_2$ gas mixture is introduced into the IL through a glass Pasteur pipette retrofitted with a glass frit to reduce the bubble size and increase the gas-liquid contact area (interfacial area). The flow is maintained at around 5 ml/min to contain the bubbles formed within the test tube.

The absorption of NO is monitored in real time by logging the weight increase with a PC interfaced with the microbalance (accuracy 0.1 mg). However, to avoid balance drifting, the absorption results are supplied by measuring the total weight of the test tube with IL and pipette before and after NO exposure. Any increase in weight of the sample after NO exposure is attributed to the absorption of NO and subsequent conversion to $HNO_3$ and variations in the water content of the sample.

The weight increase is in all cases given as the fractional molar increase, defined in equation [19]

$$X_{NO}^{IL} = \frac{n_{NO}}{n_{NO} + n_{IL}} \quad [19]$$

A Metrohm Titrando 835 Karl Fisher titration instrument was used to determine the water content on four samples with water in 1-butyl-3-methyl-imidazolium chloride (Aldrich 99%) used for the standard curve for water. The concentration was determined as the mean value of 3 titrations.

The invention claimed is:

1. A method for removing $NO_x$ gasses by an absorption process and conversion of $NO_x$ to nitric acid ($HNO_3$) in the presence of oxygen and water, wherein the $NO_x$ gasses comprise NO, $NO_2$, $N_2O_3$ and $N_2O_5$, comprising:
   a) oxidizing nitric oxide (NO) to nitrogen dioxide ($NO_2$) and other $H_xN_yO_z$ species with an ionic composition catalyst at an oxidation temperature below the decomposition temperature of the ionic composition catalyst, wherein the oxidation temperature is between 80 and 120° C., thereby forming an oxidized gas mixture, wherein x, y and z are integers in the ranges x=0-1, y=1-2, z=1-5, and
   b) absorbing $NO_2$ and other $H_xN_yO_z$ species generated in step a) and converting the absorbed $NO_2$ and other $H_xN_yO_z$ species to nitric acid ($HNO_3$), wherein the absorption and conversion occurs in a medium in the presence of oxygen and water at a temperature between 30 and 80° C. but at a temperature that is lower than the oxidation temperature in step a), wherein the nitric acid ($HNO_3$) accumulates in the medium, and wherein the ionic composition catalyst comprises one or more ionic compounds.

2. The method according to claim 1, wherein the medium is an ionic composition absorber comprising one or more ionic compounds.

3. The method according to claim 2, wherein the ionic composition absorber is different from the ionic composition catalyst.

4. The method according to claim 1, wherein either or both of the volume and flow rate of the ionic composition catalyst are adjusted to obtain a high conversion of NO to $NO_2$ and other $H_xN_yO_z$ species in the oxidized gas mixture of step a) before performing step b), the conversion of NO to $NO_2$ and other $H_xN_yO_z$ species being more than 50%.

5. The method according to claim 2, wherein either or both of the ionic composition catalyst or the ionic composition absorber comprise an ionic liquid comprising one or more organic cations selected from:

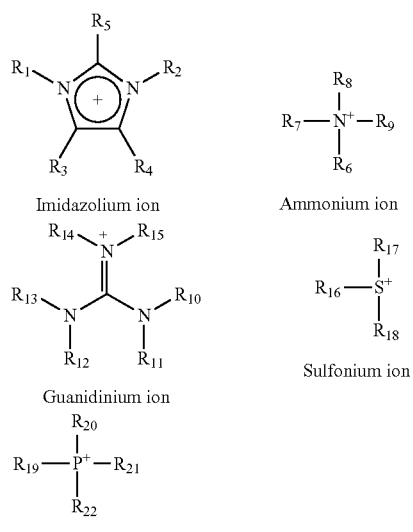

Imidazolium ion

Ammonium ion

Guanidinium ion

Sulfonium ion

Phosphonium ion wherein
$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$ and $R_{22}$ can be, independently, hydrogen, alkyl, halogenated alkyl, aminoalkyl, hydroxyalkyl, alkoxyalkyl, alkenyl, alkynyl, aryl, heteroaryl, cycloalkyl, cycloalkenyl, heterocycloalkyl, or heterocycloalkenyl;
the positively charged P, N and S atoms may individually be part of heterocyclic or heteroaromatic structures by letting:
two of $R_{19}$, $R_{20}$, $R_{21}$ or $R_{22}$ be fused such that a cyclic phosphonium ion is formed; or
two of $R_6$, $R_7$, $R_8$ or $R_9$ be fused, such that a cyclic ammonium ion is formed; or
fusion of $R_{11}$ and $R_{12}$, fusion of $R_{13}$ and $R_{14}$ or fusion of $R_{15}$ and $R_{10}$, such that a cyclic guanidinium ion is formed; or
two of $R_{16}$, $R_{17}$ or $R_{18}$ be fused, such that a cyclic sulfonium ion is formed; and wherein the ionic composition catalyst and the ionic composition absorber optionally comprise one or more cations selected from inorganic cations, and wherein the ionic composition catalyst and the ionic composition absorber optionally comprise one or more anions selected from $C_1$-$C_6$ alkanoates, arylcarboxylates, $C_1$-$C_6$ alkylsulfates, $C_1$-$C_6$ alkylsulfonates, $C_1$-$C_6$ perfluoroalkylsulfonates, $C_1$-$C_6$ perfluoroalkanoates, $C_1$-$C_6$ perfluoroalkylsulfonimides, tetrafluoroborate, hexafluorophosphate, sulfate, nitrate or halides.

6. The method according to claim 2, wherein either or both of the ionic composition catalyst or the ionic composition absorber comprise an ionic liquid comprising a cation having the following structure:

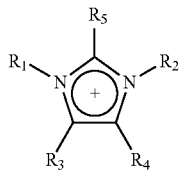

wherein $R_1$ and $R_2$ are individually selected from $C_1$-$C_8$ alkyl groups or aryl groups, and wherein $R_3$, $R_4$ and $R_5$ are individually selected from hydrogen, $C_1$-$C_6$ alkyl groups or aryl groups, or wherein $R_3$ and $R_4$ together with the imidazolium group may form a 4- to 6-membered saturated, unsaturated or aromatic ring, which may further contain up to three hetero atoms selected from oxygen, nitrogen and phosphorus.

7. The method according to claim 2, wherein either or both of the ionic composition catalyst or the ionic composition absorber comprise an ionic liquid selected from 1-ethyl-3-methylimidazolium ([EMIM]$^+$) acetate, 1-butyl-3-methylimidazolium ([BMIM]$^+$) acetate, 1-ethyl-3-methyl-imidazolium ([EMIM]$^+$) triflate, 1-butyl-3-methyl-imidazolium ([BMIM]$^+$) triflate, 1-ethyl-3-methylimidazolium ([EMIM]$^+$) nitrate, 1-butyl-3-methylimidazolium ([BMIM]$^+$) nitrate, 1-butyl-2,3-dimethylimidazolium ([BMIM]$^+$) nitrate, choline chloride, choline acetate or 1,1,3,3-tetramethylguanidinium chloride.

8. The method according to claim 2, wherein either or both of the ionic composition catalyst or the ionic composition absorber further comprise one or more cations selected from Li$^+$, Na$^+$ or K$^+$.

9. The method according to claim 2, wherein the ionic composition absorber is an ionic liquid.

10. The method according to claim 2, wherein either or both of the ionic composition catalyst or the ionic composition absorber are ionic liquids dispersed on a porous carrier and used in the form of a supported ionic liquid phase (SILP) material.

11. The method according to claim 10, wherein the porous carrier material is composed of carbon, zeolites, clays, hydroxides or oxides based on one or more of the elements Si, Al, Ti, Ce, Zr, Mg, Fe, Ca, Sr, Ba, Mn, Ge or Ga.

12. The method according to claim 1, wherein a wet scrubbing to remove $SO_2$ and $SO_3$ in any off-gasses is performed before performing step a).

13. The method according to claim 12, wherein the off-gasses are flue gases from stationary or mobile sources.

* * * * *